United States Patent
Brace et al.

(10) Patent No.: US 7,292,405 B2
(45) Date of Patent: Nov. 6, 2007

(54) DATA CARTRIDGE HOLDER OPERABLE WITH A DATA CARTRIDGE LIBRARY SYSTEM

(75) Inventors: Clark D. Brace, Westminster, CO (US); Eric A. Rinard, Boulder, CO (US); Gregory S. Rinard, Longmont, CO (US); Brian A. Ruff, Broomfield, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 10/904,535

(22) Filed: Nov. 15, 2004

(65) Prior Publication Data
US 2005/0185323 A1    Aug. 25, 2005

Related U.S. Application Data

(60) Continuation of application No. 10/248,006, filed on Dec. 9, 2002, now Pat. No. 6,819,525, which is a division of application No. 09/423,031, filed as application No. PCT/US98/08697 on Apr. 30, 1998, now Pat. No. 6,493,178.

(60) Provisional application No. 60/045,127, filed on Apr. 30, 1997.

(51) Int. Cl.
G11B 17/22    (2006.01)
G11B 15/68    (2006.01)

(52) U.S. Cl. .................... 360/92; 369/30.42; 369/30.69

(58) Field of Classification Search .................. 360/92; 369/30.42, 30.53, 30.54, 30.68, 30.69, 30.83, 369/30.84
See application file for complete search history.

(56) References Cited

U.S. PATENT DOCUMENTS

| 5,153,862 | A | * | 10/1992 | Taylor et al. | 369/30.45 |
| 5,235,474 | A | * | 8/1993 | Searle | 360/71 |
| 5,247,406 | A | * | 9/1993 | Apple et al. | 360/92 |
| 5,537,268 | A | * | 7/1996 | Felde et al. | 360/92 |
| 5,537,371 | A | * | 7/1996 | Niederlein et al. | 369/30.83 |
| 5,608,714 | A | * | 3/1997 | Shiba et al. | 369/30.84 |
| 5,659,440 | A | * | 8/1997 | Acosta et al. | 360/92 |
| 5,684,654 | A | * | 11/1997 | Searle et al. | 360/92 |
| 5,718,339 | A | * | 2/1998 | Woodruff | 211/41.12 |
| 5,768,047 | A | * | 6/1998 | Ulrich et al. | 360/92 |
| 5,940,243 | A | * | 8/1999 | Kanetsuku et al. | 360/92 |
| 5,943,305 | A | * | 8/1999 | Fitzgerald et al. | 369/30.42 |

(Continued)

FOREIGN PATENT DOCUMENTS

WO    WO 2005/010661 A2    2/2005

*Primary Examiner*—Brian E. Miller

(57) ABSTRACT

Disclosed is a data cartridge library system capable of using a data cartridge holder. The data cartridge holder comprises a bottom and side walls wherein the side walls are attached to the bottom wall at one end and form a terminal edge at another. The terminal edge defines an opening through which a plurality of data cartridges can be inserted and removed from the data cartridge holder. In one embodiment, the data cartridge holder can comprise at least a pair of hook-like structures on opposite sides of the data cartridge holder to engage a mounting structure in the data cartridge library. The data cartridge holder can further be adapted to be covered by a dust cover wherein the dust cover can be capable of engaging the data cartridge holder in a first and second position without impeding either the insertion or extraction of a data cartridge or the engagement with the mounting structure of the library.

17 Claims, 26 Drawing Sheets

U.S. PATENT DOCUMENTS

| | | | |
|---|---|---|---|
| 5,995,477 A * | 11/1999 | Smith et al. | 369/30.42 |
| 6,353,581 B1 * | 3/2002 | Offerman et al. | 369/30.4 |
| 6,480,443 B1 * | 11/2002 | Foslien et al. | 369/30.42 |
| 6,580,582 B1 * | 6/2003 | Caverly | 360/92 |
| 6,819,525 B2 * | 11/2004 | Brace et al. | 360/92 |
| 2004/0105187 A1 | 6/2004 | Woodruff et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0047258 A1 | 3/2005 | Starr et al. | |
| 2005/0057847 A1 | 3/2005 | Armagost et al. | |
| 2005/0063089 A1 | 3/2005 | Starr et al. | |
| 2005/0065637 A1 | 3/2005 | Lantry et al. | |
| 2005/0195517 A1 | 9/2005 | Brace et al. | |
| 2005/0195518 A1 | 9/2005 | Starr et al. | |
| 2005/0195519 A1 | 9/2005 | Kumpon et al. | |
| 2005/0195520 A1 | 9/2005 | Starr et al. | |
| 2005/0219964 A1 | 10/2005 | Pollard et al. | |
| 2005/0246484 A1 | 11/2005 | Lantry et al. | |
| 2005/0267627 A1 | 12/2005 | Lantry et al. | |

* cited by examiner

DATA CARTRIDGE HOLDER OPERABLE WITH A DATA CARTRIDGE LIBRARY SYSTEM

CROSS REFERENCE TO RELATED APPLICATIONS

The present application is a continuation of and claims priority and the benefit of U.S. patent application Ser. No. 10/248,006 (now U.S. Pat. No. 6,819,525) filed Dec. 9, 2002 which is a divisional of U.S. patent application Ser. No. 09/423,031 (now U.S. Pat. No. 6,493,178) filed Nov. 24, 2000 as a national-phase application of PCT/US98/08697 filed Apr. 30, 1998 which claims priority to and the benefit of provisional U.S. Ser. No. 60/045,127 filed Apr. 30, 1997, the disclosures all of which are incorporated herein by reference.

FIELD OF THE INVENTION

The present invention relates to data cartridge library systems that are capable of storing a plurality of data cartridges, such as tape cartridges, in a storage array and selectively moving a data cartridge between the array and a drive that transfers data between a host computer and a recording medium located within a data cartridge device.

DESCRIPTION OF THE RELATED ART

Data cartridge library systems are primarily used to archive data, i.e. store data that is or may be important to the user of a computer system but not immediately needed by the user. To elaborate, the typical library system receives data from a host computer and stores the data in one or more data cartridges. When the host computer requires some of the data that was previously stored in a data cartridge, a request for the data is sent from the host computer to the library system. In response, the library system locates the data cartridge that contains the data being requested and transmits the data to the host computer.

The typical data cartridge library system is comprised of a cartridge holder with a plurality of storage slots that are used for storing a plurality of data cartridges, a player/recorder device for reading data that has been stored on the recording medium located within a data cartridge and/or writing data onto the recording medium, and a transport device for moving data cartridges between the cartridge holder and the player/recorder device. To store data in a data cartridge, the library system initially uses the transport device to load a data cartridge into the player/recorder device. Once the data cartridge has been loaded into the player/recorder device, the drive records or writes data from the host computer onto the recording medium located within the data cartridge. After all of the data has been recorded, the transport device removes the data cartridge from the player/recorder device and places the data cartridge in one of the slots of the cartridge holder. Generally, at some later time, the host computer has a need for the data stored on the data cartridge and issues a request for the data to the library system. In response, the library system identifies the slot of the cartridge holder in which the data cartridge on which the needed data is stored, causes the transport device to move the data cartridge from the slot to the player/recorder device. Once the data cartridge is loaded into the player/recorder, the desired data on the recording medium located within the cartridge is read by the player/recorder and passed on to the host computer.

SUMMARY OF THE INVENTION

The present invention addresses the need for a low-cost data cartridge library system by reducing the number of certain components, especially expensive components, that are needed to perform certain functions within the library. Cost reduction is also achieved with respect to particular library functions by using less expensive, low-precision componentry in combination with componentry that compensates for the low-precision and still provides a reduced cost relative to high-precision componentry.

One embodiment of the invention provides a data cartridge library with a picker assembly that utilizes a single electromechanical device to accomplish the following functions: (1) grasping a data cartridge located in either a slot of the data cartridge holder or in the drive; (2) retracting a grasped cartridge a sufficient distance from the holder or the drive so that the cartridge can be moved to another location within the library; (3) inserting a grasped cartridge into a slot of the data cartridge holder or into the drive; and (4) releasing a data cartridge that has been inserted into either a slot of the data cartridge holder or the drive. In contrast, most known data cartridge library systems use two electro-mechanical devices to accomplish the noted functions, one to perform the grasping and releasing function and the other to accomplish the retracting and inserting functions. In one embodiment, a single electro-mechanical device is used to move a cam that contacts a cam follower surface on a grasping portion of the picker, i.e. the portion of the picker that is capable of grasping, retracting, inserting and releasing a data cartridge, in a fashion that accomplishes each of the noted functions. In one embodiment, the cam follower surface includes two distinct cam follower surfaces that are contacted by different portions of the cam. Interaction between the cam with the first cam follower surface causes the grasper to be displaced either towards or away from the data cartridge holder or drive to accomplish the retraction and insertion functions, respectively. The grasping and releasing of a data cartridge is attributable to the interaction between the cam and the second cam follower surface.

A further embodiment of the invention provides a data cartridge library with a picker assembly that limits the force applied to the picker assembly during operations involving the drive. For instance, during a retraction operation, variations in the operation of one drive from another drive may result in a data cartridge being positioned closer to the picker by one drive than another drive. A data cartridge that is positioned closer to the picker than anticipated will result in the picker contacting the data cartridge sooner than expected and a force being applied by the data cartridge to the picker that could damage the picker and/or the data cartridge. Similarly, during an insertion operation, the drive may be positioned closer to the picker than anticipated and produce a similar problem. The problems can be addressed by either time consuming and perhaps expensive adjustment of the components and/or by employing high precision design techniques. The present invention reduces the need for such approaches by providing a picker with a force limiter or compensator. In one embodiment, the picker assembly employs a spring between the grasping portion of the picker assembly, i.e. the portion of the picker assembly that is used to grasp, retract, insert and release a data cartridge, and a portion of the picker that contributes to moving the grasper towards and away from the drive to compensate for the noted variations in distance of a cartridge during a retraction operation and factors that may result in an undesirable force being applied to the picker during an insertion operation.

The spring permits the grasping portion of the picker assembly to move relative to the portion of the picker assembly that is used to move the grasper when a data cartridge is contacted earlier than anticipated.

Another embodiment of the invention provides a data cartridge library with a picker assembly that includes a grasper, i.e. the portion of the picker assembly that is used to grasp, retract, insert and release a data cartridge, and a device for moving the grasper during insertion and retraction operations such that the velocity of the grasper varies in a substantially sinusoidal manner. The permits the grasper to be moved at a slower velocity when near the data cartridge holder/drive and a faster velocity further from the cartridge holder/drive. In one embodiment, a circular gear with an attached cam that contacts a cam follower surface associated with the grasper is used in the retraction and insertion operations. The gear provides the sinusoidal aspect of the motion. By moving the grasper in a sinusoidal manner, greater force can be applied to a data cartridge during the point in the insertion and retraction operations involving the drive. To elaborate, some drives require that a data cartridge be forcefully inserted into and/or retracted from the drive. The greater force with the slower speed provide reliable insertion/retraction of a data cartridge into/from such drives. In another embodiment, the sinusoidal movement of the grasper is combined with the force limiter. This permits the appropriate amount of force to be applied to a data cartridge during insertion/retraction of a data cartridge with respect to the drive, while also limiting the applied force to prevent damage to the picker assembly and/or the data cartridge.

Another embodiment of the invention provides a data cartridge library with picker assembly that can be controlled during insertion and extraction movement to reduce wear on the componentry and thereby reduce maintenance and/or replacement associated costs. Known picker assemblies operate such that the grasper is always returned to the fully retracted position following the insertion of a data cartridge into either the data cartridge holder or the drive. The fully retracted position is the point at which a transport device that is used to move the picker assembly to various locations within the library can move the picker assembly when the picker assembly is grasping a data cartridge. Insertion of a data cartridge that is being held by the grasper commences by moving the grasper towards either the data cartridge holder or drive and continuing with this movement until the data cartridge can be released. Following insertion of the data cartridge, known data cartridge library systems return the picker assembly to the fully retracted position. Subsequently, to retract a data cartridge from either the data cartridge holder or the drive, the known library systems must move the picker assembly from the fully retracted position to a point at which a data cartridge can be grasped.

The present invention avoids the need to move the grasper from the fully retracted position when the grasper is not holding a data cartridge to grasp a data cartridge located in either the data cartridge holder or drive. The present invention provides a picker assembly that can be positioned at a point that is closer to one of the data cartridge holder and drive than the fully retracted position when the grasper is not holding a data cartridge. In one embodiment, the picker assembly provides the ability to position the grasper at substantially the extended position at which the grasper grasps or begins to grasp a data cartridge located within the data cartridge holder or drive. Consequently, a subsequent retraction of a data cartridge from either the data cartridge holder or drive merely requires the picker assembly to grasp the cartridge and then retract the cartridge for subsequent positioning elsewhere in the library, thereby avoiding the need to move the picker from the fully retracted position as a preclude to grasping the data cartridge. In another embodiment, the picker assembly employs a grasper with two members for use in grasping opposite sides of a data cartridge that move linearly towards and away from one another in grasping and releasing a data cartridge, respectively. By moving the members in a linear manner, the picker assembly can positioned closer to the cartridge holder/drive than picker assemblies that grasp a data cartridge using members that rotate about a pivot point. In another embodiment, the two members are each L-shaped to further facilitate the positioning of the picker assembly close to the cartridge holder or drive.

Yet another embodiment of the invention provides a data cartridge library system that employs a transport mechanism for moving a picker assembly that makes use a guide mechanism which defines at least part of the space in which the picker assembly is constrained to move to also form part of the mechanism that is used to move the picker assembly within the defined space. In one embodiment, the transport assembly includes two opposing surfaces and a drive device for use in moving the picker assembly. A portion of the drive device is operatively attached to the picker assembly and is used to apply force to the opposing surfaces to move the picker assembly to a desired location within the library. Consequently, the opposing surfaces and the portion of the drive device that is attached to the picker act both to: (1) constrain the space within which the picker assembly can move; and (2) cooperate in moving the picker assembly from one location to another within the library. In this embodiment, the opposing surfaces and portion of the drive device associated with the picker assembly constrain movement of the picker assembly in two orthogonal dimensions but not the third orthogonal dimension. As a consequence, it is possible to displace the picker such that the drive device is no longer contact the opposing surfaces. To address this problem, another embodiment uses a second pair of opposing surfaces to constrain the movement of the picker assembly in the third dimension.

In one embodiment, the first opposing surface is comprised of a first pair of racks that are substantially parallel to one another and face one direction. The second opposing surface is comprised of a second pair of racks that are substantially parallel to the first pair of racks but face in the opposite direction. Operatively attached to the picker assembly is a gear system that engages the racks and is used in moving the picker assembly within the space defined by the racks. The gear system operates such that the gears that engage the first pair of racks rotate oppositely from the gears that engage the second pair of racks in moving the picker assembly up and down the racks. The gear system and racks cooperate to constrain the space within which the picker assembly can move in two dimensions. A pair of surface that are substantially perpendicular to the directions that the rack face are used to constrain the movement of the picker assembly in the third dimension.

Another embodiment of the invention provides a data cartridge library with a face plate extension to the face plate of the drive that facilitates insertion of a data cartridge into a drive, thereby reducing the need for high precision in the componentry and/or design of the library, especially with respect to the picker assembly, transport device for moving the picker assembly, and the positional relationship of the picker assembly, transport device and drive. Generally, a face plate extension positions a data cartridge that is misaligned for insertion into a drive by using ramps to apply aligning forces to the surfaces of the data cartridge as the cartridge is being moved towards the drive. A data cartridge is generally a box-like structure with a top surface, a bottom surface, first side surface, second side surface, front surface and back surface. The front surface is the surface of the data cartridge that initially enters the drive. Known face plate extensions provide ramps for contacting at least one and potentially all of the top, bottom, first side and second side surfaces of a misaligned data cartridge to align the data cartridge for insertion into the drive. One such face plate extension is essentially a rectangularly shaped funnel in which a first pair of oppositely disposed ramps are positioned to contact the sides of the cartridge, and a second pair of oppositely disposed ramps are positioned to contact the top and bottom of the cartridge.

The present invention provides a face plate extension that has recognized that certain types of data cartridges have a discontinuity that permits an aligning structure to be realized in which a misaligned data cartridge can be aligned for insertion into the drive by applying an aligning force to one and at most three of the top, bottom, first side and second side surfaces. In one embodiment, the face plate extension provides a ramp structure that applies the necessary aligning forces to one and at most two of the surfaces of a misaligned cartridge. The face plate extension can be used, for example, with a TRAVAN tape cartridge. A TRAVAN tape cartridge has a bottom surface and a top surface with a step discontinuity. The face plate extension provides a first ramp structure for contacting either or both of the top and bottom surface to correct one possible type of misalignment of the data cartridge. A second ramp structure makes use of the discontinuity on the top surface of the cartridge to correct a second type of misalignment. In the case of a TRAVAN tape cartridge, the step in the top surface of the cartridge is utilized to correct a second type of misalignment. In one embodiment, the first ramp structure is located closer to the picker than the second ramp structure. Consequently, the face plate extension operates to sequentially align a misaligned data cartridge, i.e. a first type of misalignment is corrected followed by the correction of a second type of misalignment.

The present invention also provides a removable data cartridge holder for use in a data cartridge library that includes an open-sided box-like structure for holding a plurality of data cartridges, a dust cover and an coupling apparatus for attaching the dust cover to the data cartridge library when box-like structure is in use, i.e. mounted in the library with the opening of the box-like cover exposed so that data cartridges can be moved in and out of the box-like structure. When the box-like structure is dismounted from the library, the dust cover can be placed over the opening to protect any data cartridges contained in the box-like structure. In one embodiment, the coupling apparatus operates to attach the dust cover to the box-like structure. In another embodiment, the dust cover possesses a U-shaped cross-section and the coupling apparatus serves to connect the dust cover to the box-like structure such that the box-like structure is nested inside the U-shaped dust cover. A further embodiment of the holder that provides a U-shaped dust cover and the noted nesting feature includes a connecting device for adhering the box-like structure and attached dust cover to a surface within the library. In one embodiment, the connecting device also provides a reference surface that facilitates the desired orientation of the box-like structure within the library housing.

The present invention further provides a data cartridge holder that includes a cantilevered retaining member for holding a data cartridge in the holder, thereby inhibiting the accidental displacement or removal of the data cartridge from the holder. The data cartridge holder is a box-like structure with an open side that permits data cartridges to be inserted/removed into/from the holder. The cantilevered retaining member has a fixed end, which is attached to the box-like structure, and a free or floating end that is located further from the opening than the fixed and, in response to the insertion or extraction of a data cartridge, is displaced. To elaborate, during insertion of a data cartridge, the free end of the member is initially displaced to permit the cartridge to be fully inserted into the holder. However, upon complete insertion the free end of member returns to its unflexed or initial position to engage a notch or similar structure associated with the data cartridge and thereby inhibit accidental removal of the cartridge from the holder. In one embodiment, the cantilevered retaining member has a dog-leg shape with a first portion that is located between the point at which the member is attached to the housing and an intermediate point on the member. The portion of the member is disposed at an acute angle to the side wall of the holder and operates as a ramp to aid in positioning a data cartridge during insertion into the holder. The second portion of the member operatively engages the notch or other feature on the cartridge to hold the cartridge in place. In one embodiment, the second portion of the member is substantially parallel to the side wall of the holder. In yet a further embodiment, a second cantilevered retain member is disposed in the holder to engage another notch or other feature associated with a data cartridge.

The present invention also provides a data cartridge holder that includes an orientation device that inhibits the insertion of improperly oriented data cartridges of the type that include a door which can be rotated about a pivot point to expose the recording media within the cartridge. When a data cartridge of this type is improperly oriented for insertion into the holder, the orient device operates to open door of the cartridge. The opened door subsequently engages a portion of the cartridge holder such that further insertion of the data cartridge is inhibited. It is desirable to insert a data cartridge into the holder in the same orientation as the cartridges are inserted into the drive, i.e. front face first, to simplify the design and operation of the picker assembly. In contrast, if a cartridge is inserted into the data cartridge holder with a different orientation than when the cartridge is inserted into the drive, the picker assembly must provide the ability to reorient the data cartridge between the time the cartridge is removed from the holder and the time the data cartridge is inserted into the drive.

DETAILED DESCRIPTION OF THE INVENTION

Figure 1:
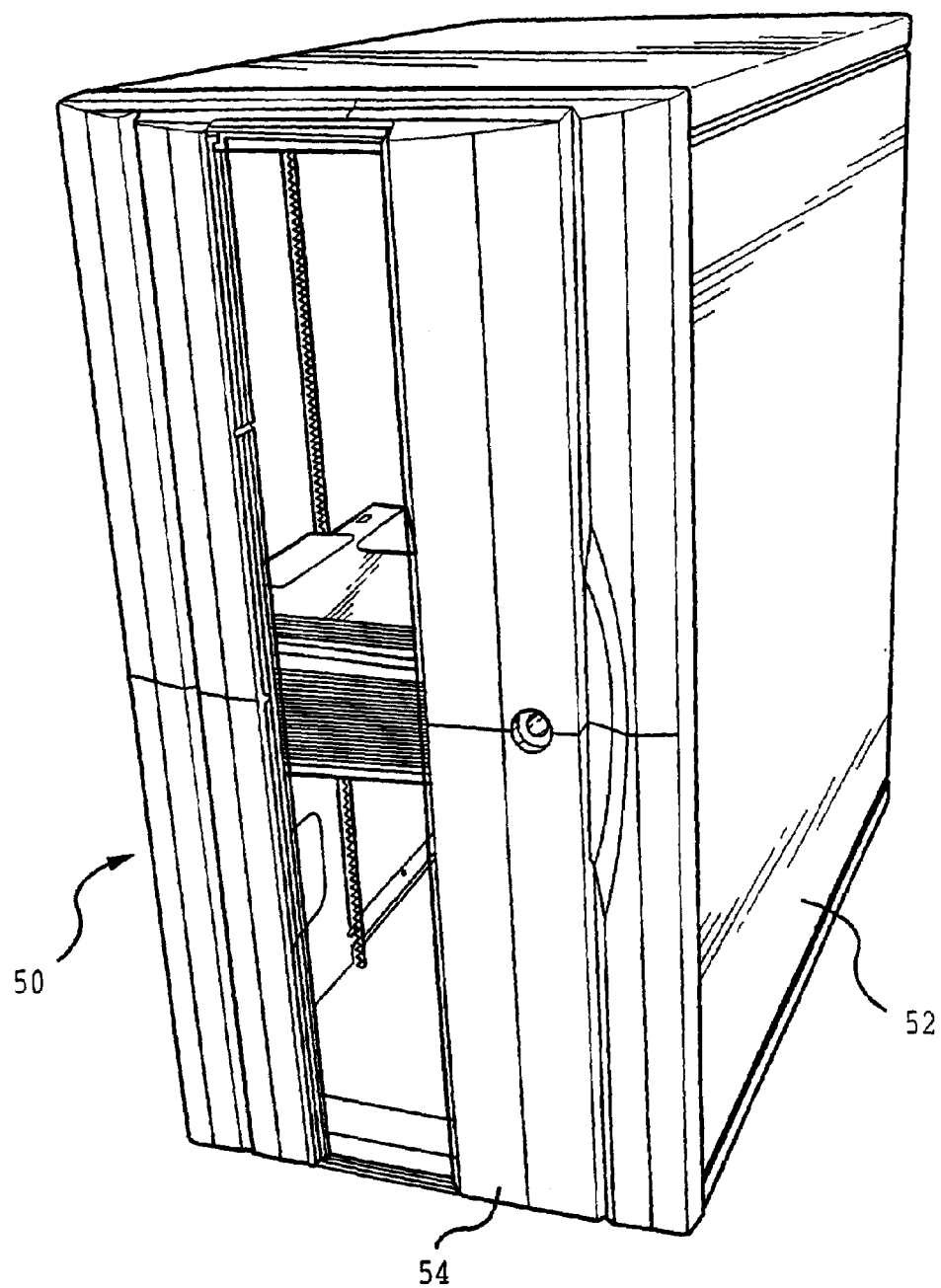
FIG. 1 is an exterior perspective view of a preferred embodiment of the tape library system.
Figure 2:
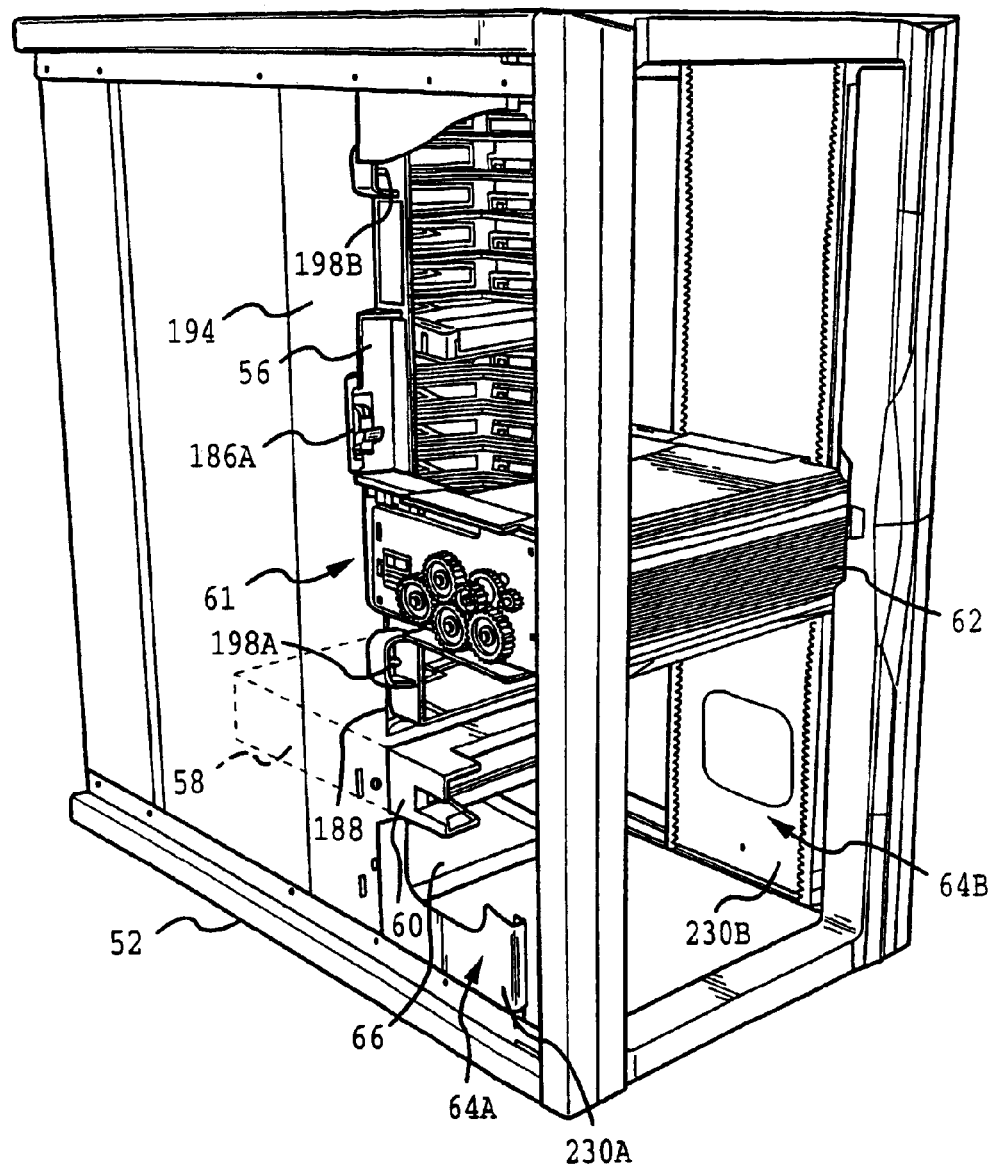
FIG. 2 is a cutaway, perspective view of the embodiment of the tape library system shown in FIG. 1.

With reference to FIGS. 1 and 2, the primary components associated with the preferred embodiment of the tape library system, hereinafter referred to as library 50, are described. The library 50 includes a cabinet 52 for housing components of the library and a door 54 that permits user access into the interior of the cabinet 52. Within the cabinet are located a removable, tape cartridge holder 56 for storing a plurality of tape cartridges, a Travan tape drive 58 that is located behind a drive faceplate extension 60, and a transport assembly for moving tape cartridges between the holder 56 and the tape drive 58. The transport assembly includes an elevator assembly 61 that employs a pair of rack gear pairs 64A, 64B to move tape cartridges that are held by a picker assembly 62 between the holder 56 and the tape drive 58. The tape drive 58 is capable of transmitting/receiving data to/from a host computer via a data communication interface (not shown) that is located on the back of the cabinet. While the library 50 is shown as only having one tape drive, it should be appreciated that a slot 66 is available for accommodating another tape drive and face plate assembly. The library 50 can be positioned either vertically, as shown, or horizontally.

Figure 3A:
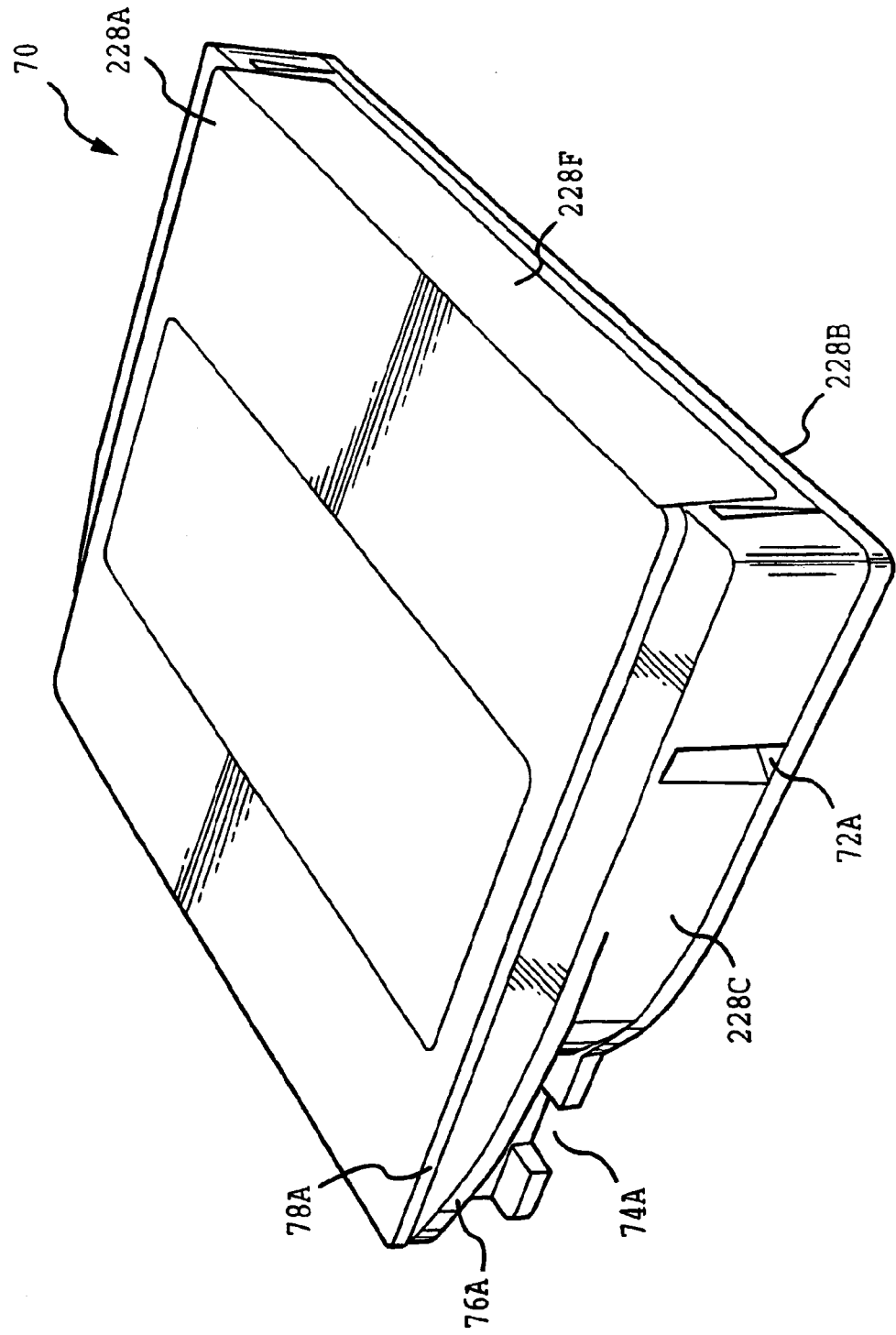
FIGS. 3A-3C are perspective views of a Travan tape cartridge that is employed in the tape library system shown in FIG. 1.
Figure 3B:
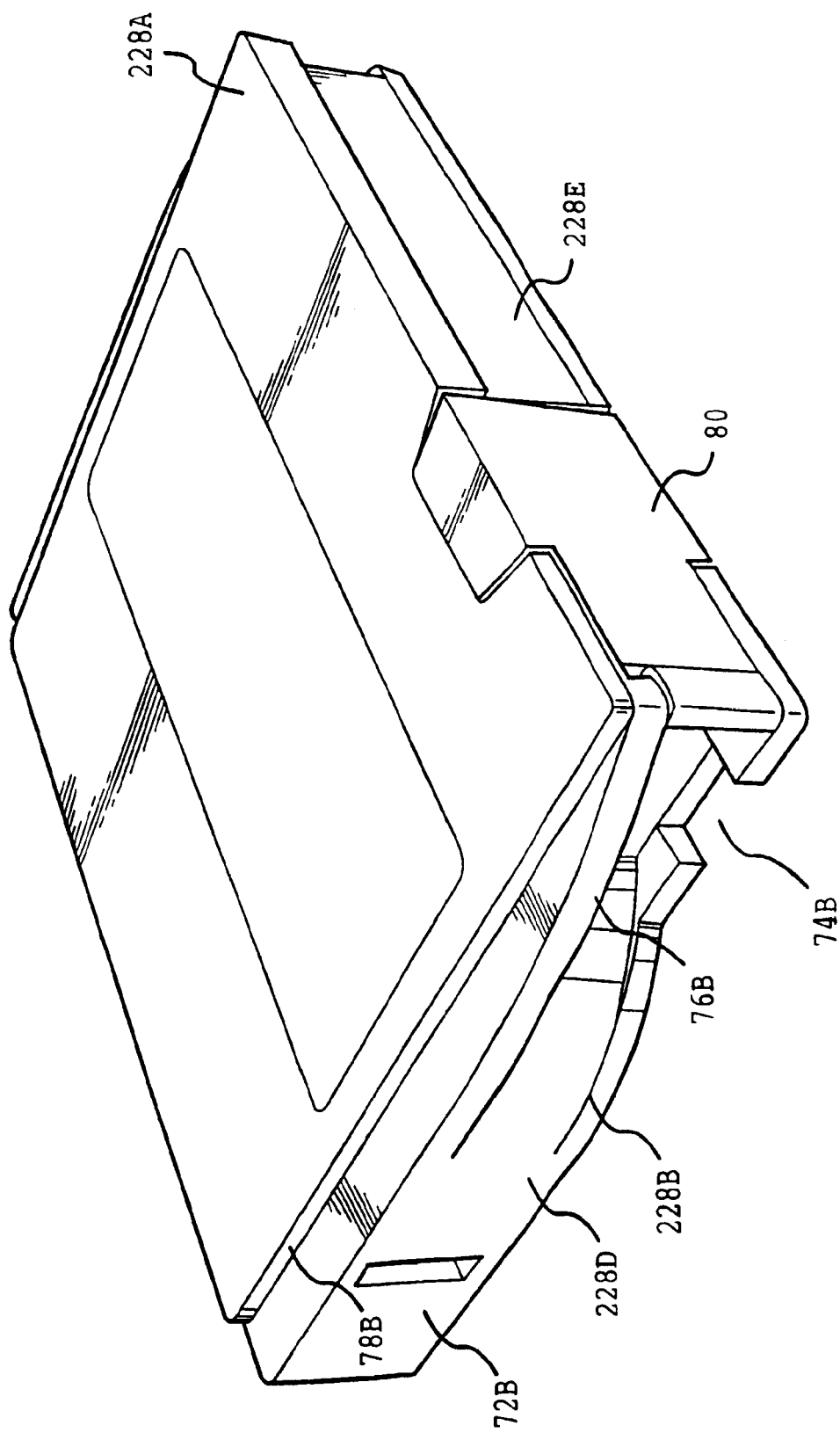
Figure 3C:
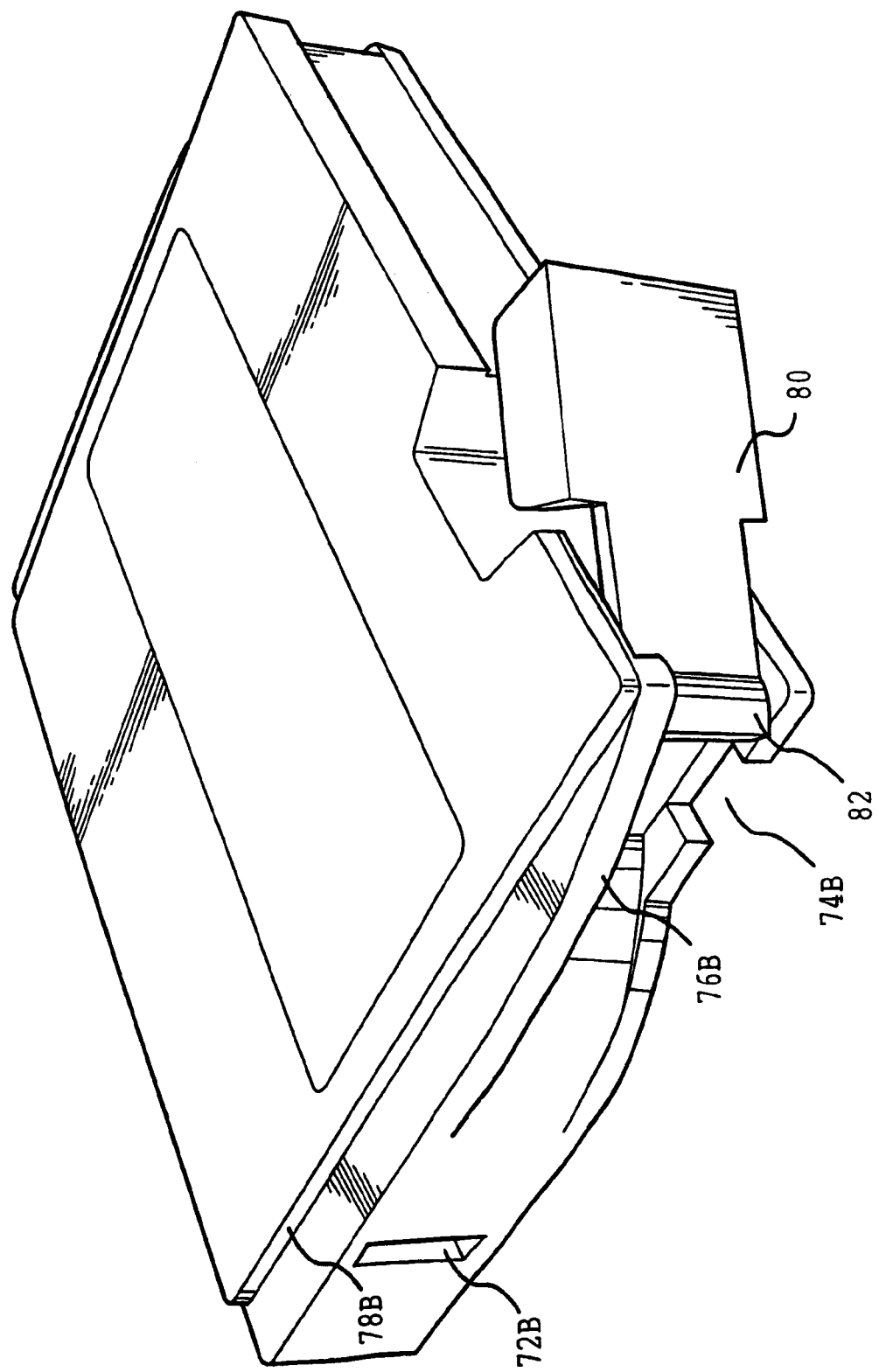

FIGS. 3A-3C illustrate a Travan tape cartridge 70 suitable for use with the Travan tape drive 58. The Travan tape cartridge 70 is characterized by a pair of cartridge gripping notches 72A, 72B that will be utilized by the picker assembly in moving the cartridge within the library 50. A pair of cartridge retaining notches 74A, 74B are utilized by the Travan tape drive 58 to retain and position the cartridge within the drive. A pair of tapered side surfaces 76A, 76B are used to facilitate insertion of the cartridge into a cartridge holder. Also characteristic of the cartridge 70 is a pair of vertical steps 78A, 78B in the top surface of the cartridge. The cartridge also includes an access door 80 that protects the tape when closed and exposes the tape for read/write operations when open. As shown in FIG. 3C, the access door 80 pivots to expose the tape when an access door following surface 82 is contacted by a camming surface within the drive. It should be appreciated that the library 50 can be adapted to accommodate data cartridges other than the Travan tape cartridge 70. The tape cartridge 70 generally has a top side 228A, bottom side 228B, first lateral side 228C, second lateral side 228D, front side 228E and back side 228F.

Figure 4:
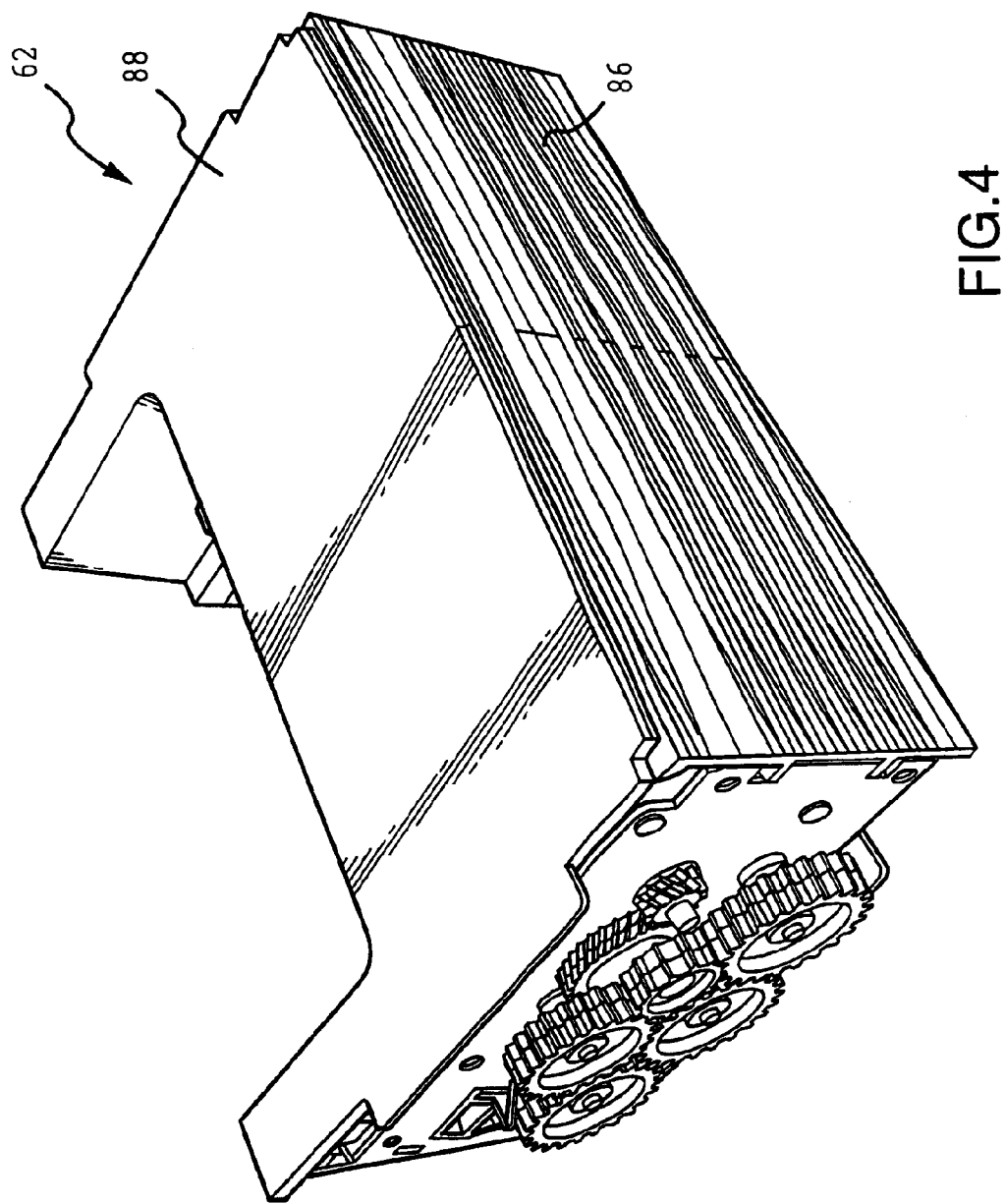
FIG. 4 is a perspective view of the picker assembly.
Figure 5:
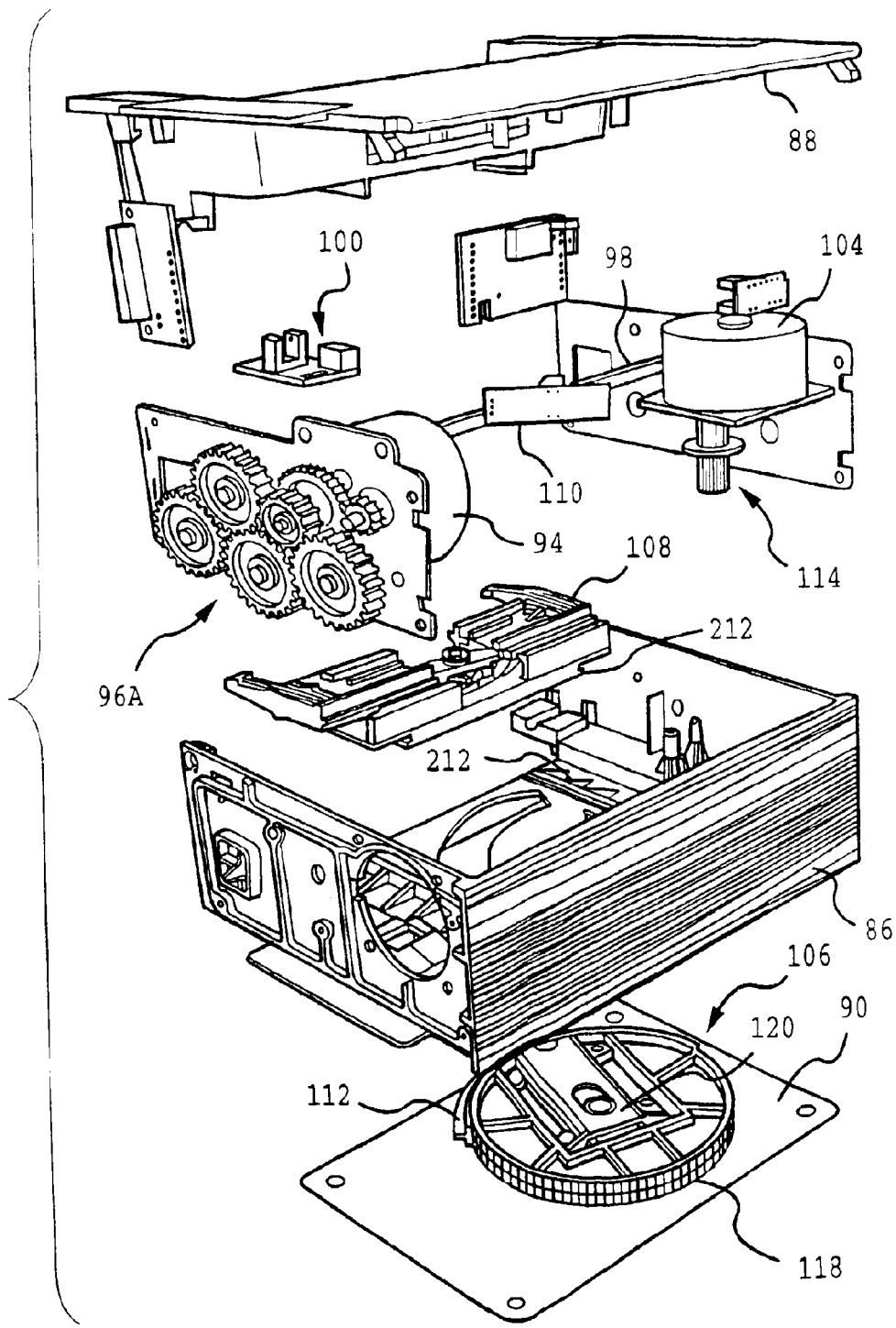
FIG. 5 is an exploded view of the picker assembly shown in FIG. 4.

With reference to FIGS. 4 and 5, the picker assembly 62 generally includes a housing that includes a picker housing base 86, picker top plate 88 and picker bottom plate 90. Within or attached to the picker housing are components that are used to accomplish one of the two following functions: (1) moving the picker assembly up and down along the rack gear pairs 64A, 64B, i.e. components of the elevator assembly 61; and (2) extracting/inserting a tape cartridge from/into the cartridge holder 56 or the tape drive 58, as well as grasping and releasing tape cartridges.

Figure 6:
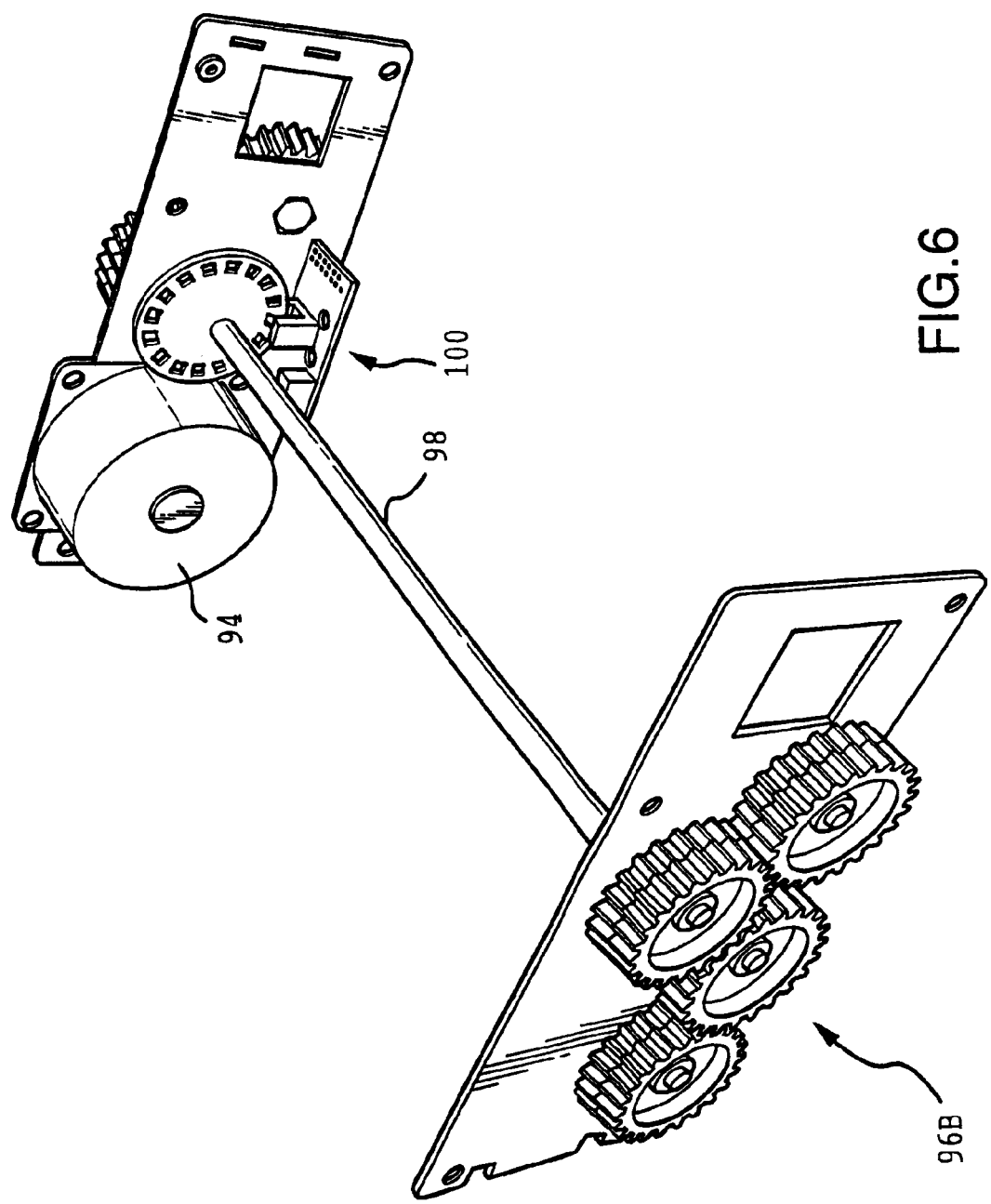
FIG. 6 illustrates the portions of the elevator assembly that are associated with the picker assembly.
Figure 7:
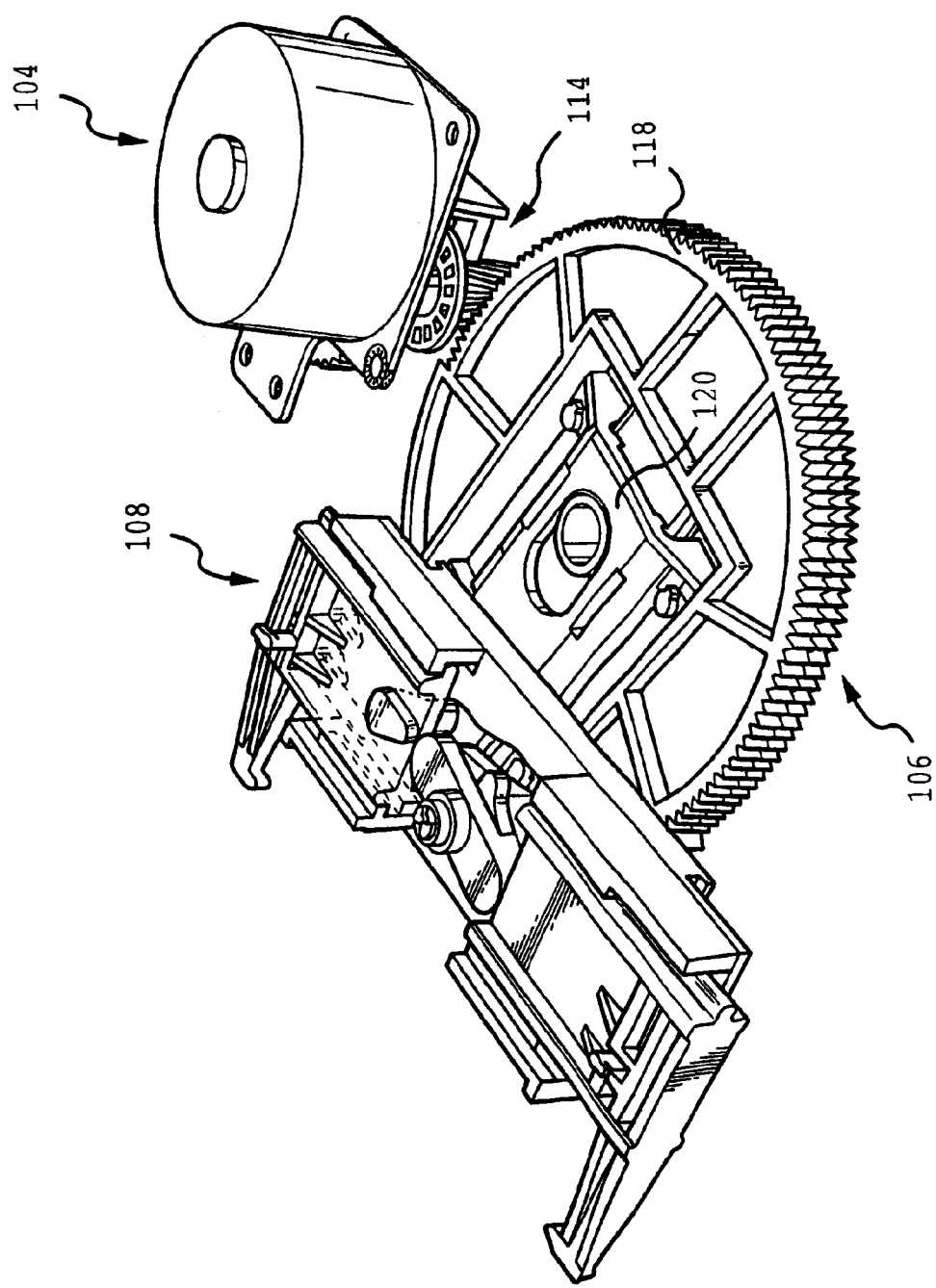
FIG. 7 is a free body diagram of the gripper assembly, gripper stepper motor assembly and gripper crank assembly.
Figure 8:
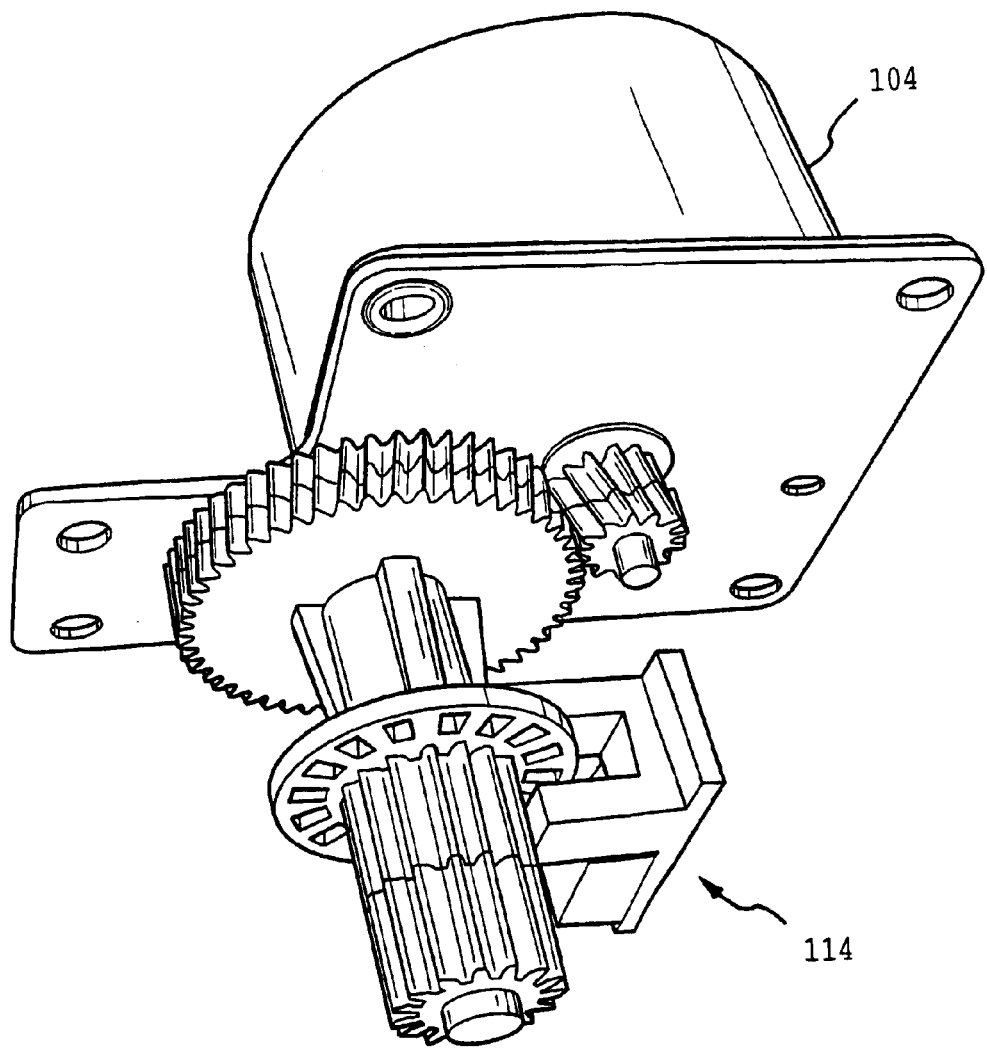
FIG. 8 illustrates the gripper stepper motor assembly.
Figure 9:
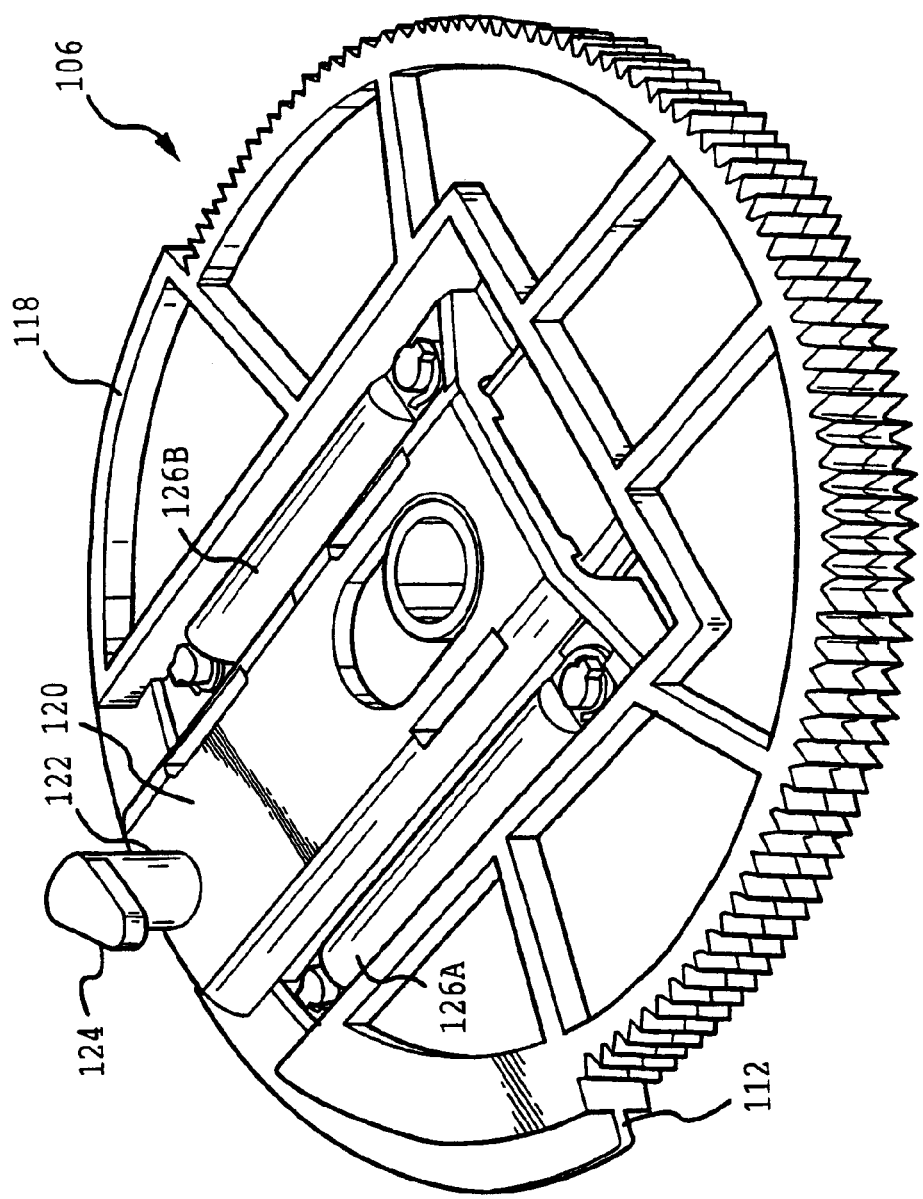
FIG. 9 illustrates the gripper crank assembly.

With reference to FIG. 6 and continuing reference to FIG. 5, the components associated with moving the picker assembly 62 up and down along the rack gear pairs 64A, 64B (which each provide two opposing surfaces) is described. Generally, an elevator stepper motor 94 drives a first elevator gear train 96A and a second elevator gear train 96B that are connected to one another by an elevator cross shaft 98 to move the picker assembly 62 up and down along the rack gear pairs 64A, 64B. The first and second gear trains 96A, 96B respectively interface with the rack gear pairs 64A, 64B such that when the elevator stepper motor is activated the picker assembly 62 moves up or down the racks. The position of the picker assembly 62 is known by counting the "steps" needed by the elevator stepper motor 94 relative to a known reference point to position the picker assembly 62 in front of the slots of the tape cartridge holder 56 and the tape drive 58. An elevator motion detector assembly 100 is used to determine whether or not the elevator stepper motor 94 is moving appropriately in relation to the step count. Failure of the elevator stepper motor 94 to move in response to step commands indicates that the picker assembly 62 has reached an end of its range of motion or has jammed.

With respect to movement of picker assembly, it should be noted that the racks gear pairs 64A, 64B guide the picker assembly 62, as well as contribute to the moving of the picker assembly 62 by interacting with the first and second gear trains 96A, 96B. With respect to the guiding function, the rack portions of the rack gear pairs 64A, 64B cooperate with the first and second gear trains 96A, 96B to constrain the movement in two dimensions. Namely, in the illustrated embodiment, the front-to-back dimension and the up-down dimension. To constrain lateral movement of the picker assembly 62, the rack gear pairs 64A, 64B respectively provide surfaces 230A, 230B that prevent the picker assembly 62 from being laterally displaced to the point where the first and second gear trains 96A, 96B become disengaged from the rack gear pairs 64A, 64B.

With reference to FIGS. 7-10 and continuing reference to FIG. 5, the components associated with extracting/inserting a tape cartridge from/to the cartridge holder 56 or tape drive 58 and gripping/releasing a tape cartridge are described. Generally, a gripper stepper motor 104 causes a gripper crank assembly 106 that is journaled to the picker bottom plate 90 to rotate. Rotation of the gripper crank assembly 106 causes, in turn, a gripper assembly 108 to either (1) move towards/away from the cartridge holder 56 or tape drive 58 for extraction/insertion operations; or (2) grasp/release a tape cartridge. The position of the gripper assembly 108 is known by counting the "steps" through which the gripper stepper motor 104 has moved relative to a known reference point. A crank position sensor 110 which detects the presence/absence of a crank position edge 112 within the sensor's field of view is used to determine the state of the gripper during power up. A gripper motion detector 114 indicates whether or not the gripper stepper motor 104 is moving appropriately in relation to the step count. Failure of the gripper stepper motor 104 to move in response to step commands indicates that the gripper crank gear 118 has reached an end of its range of motion or has jammed.

It should be appreciated that all of the sensor devices previously and hereafter mentioned interface to a computer with in the library that is comprised of a processor, an appropriately programmed memory and one or more output ports for controlling the stepper motors and like devices.

The gripper crank assembly 106 is comprised of a gripper crank gear 118 and a slide pin 120 that interfaces with the gripper assembly 108. The slide pin 120 includes a pin 122 that interacts with a surface of the gripper assembly 108 so as to primarily affect the distance of the gripper assembly 108 from the cartridge holder 56 or tape drive 58. Also part of the slide pin is cam hold-open 124 arm that primarily interacts with another portion of the gripper assembly 108 to actuate the portion the gripper assembly 108 that is responsible for grasping tape cartridges. The slide pin 120 is biased in the position illustrated in FIG. 9 by a pair of slide pin springs 126A, 126B. The slide pin springs 126A, 126B do, however, permit the slide pin 120 to move towards the center of the gripper crank gear 118 if a tape cartridge is encountered earlier than expected. This allows the fixed and predetermined path of motion of the gripper assembly 108 to adapt to variations within the library 50 and variations from library to library. The force received by the gripper assembly 108 from the tape cartridge is, in turn, transmitted to the slider pin 120 which accommodates this force by sliding back towards the center of the gripper crank gear 118. Once the force on the gripper assembly 108 is removed, the slide pin springs 126A, 126B operate to return the slide pin 120 to its normal position.

Figure 10:
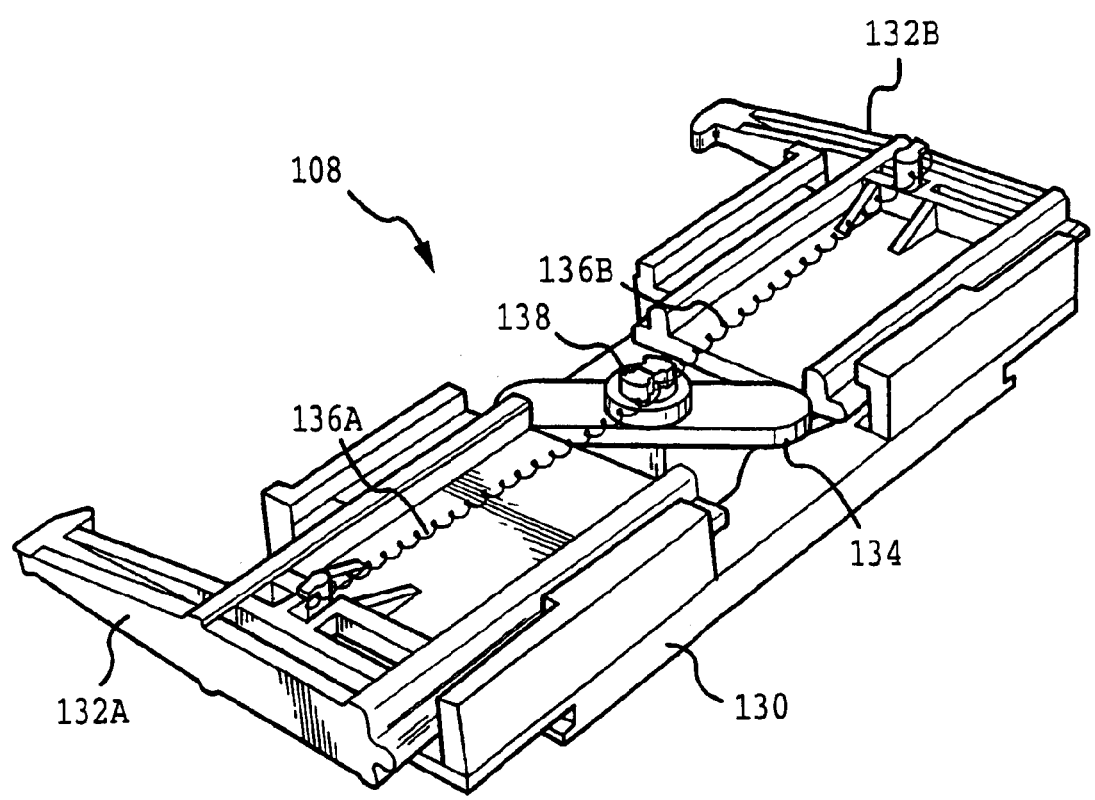
FIG. 10 illustrates the gripper assembly.
Figure 11:
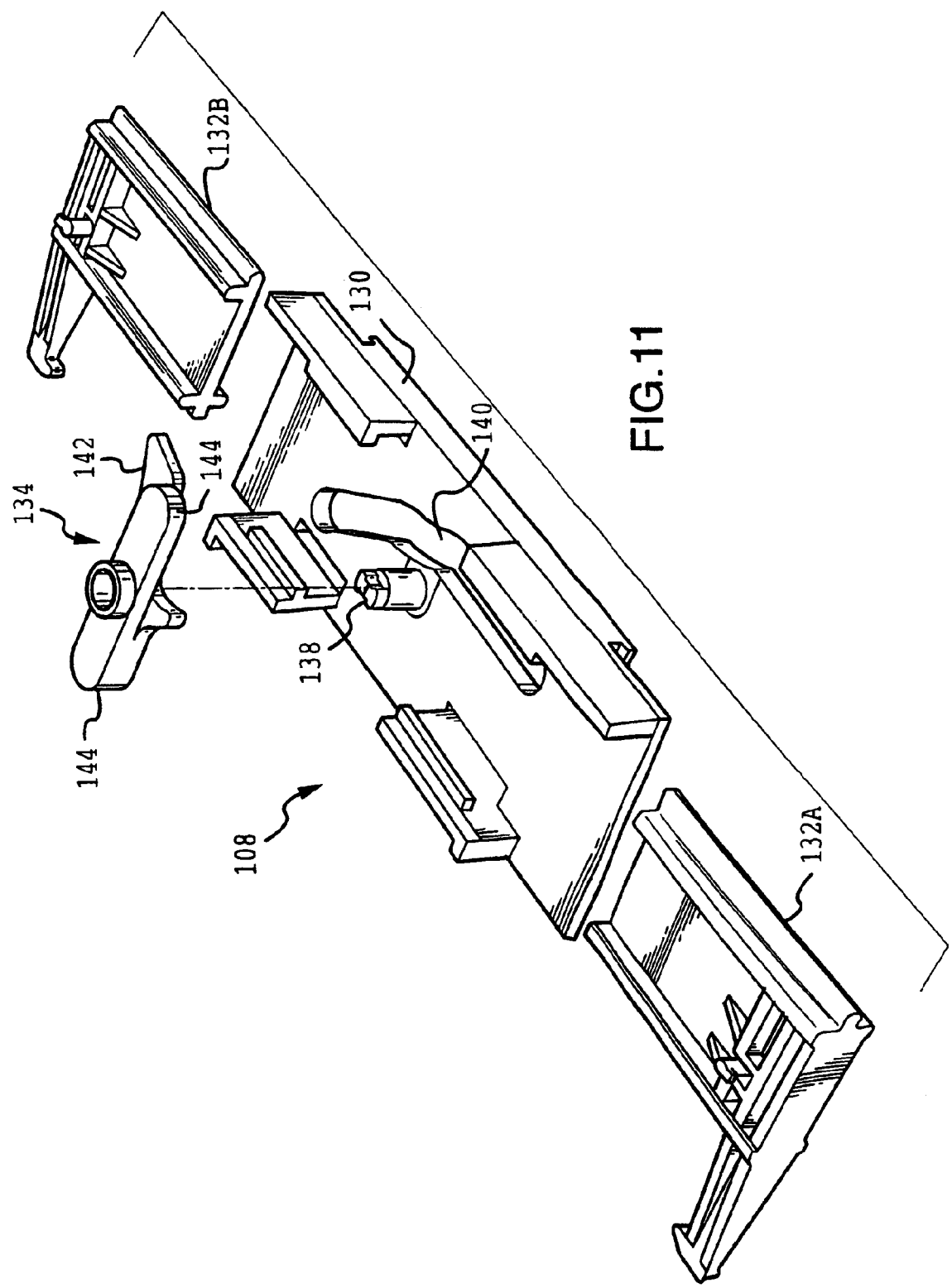
FIG. 11 is an exploded view of the gripper assembly.

With reference to FIGS. 10 and 11, the gripper assembly 108 is comprised of a pusher 130 and first and second gripper jaws 132A, 132B, which are slidably mounted on the pusher 130. The gripper assembly 108 also includes a gripper jaw cam 134 for use in separating first and second jaws 132A, 132B from one another so that a tape cartridge can be grasped. The gripper jaw cam 134 operates to open the first and second gripper jaws 132A, 132B in opposition to first and second gripper jaw springs 136A, 136B. The one end of each of the first and second gripper jaw springs 136A, 136B is connected to a gripper jaw and the other end of each of the springs is connected to a gripper standard 138. The gripper standard 138, which is a portion of the pusher 130, also serves as a mount of the gripper jaw cam 134.

Also part of the pusher 130 is a crank pin slot 140 that defines the surface on pusher 130 which engages the pin 122 of the gripper crank assembly 106.

With continuing reference to FIG. 11, the gripper jaw cam 134 includes a hold-open arm 142 that engages the cam hold-open arm 124 of the gripper crank assembly 106. During a particular point in the rotation of the gripper crank gear 118, the cam hold-open arm 124 engages the hold-open arm 142 and upon further rotation causes the hold-open arm 142 to remain rotated and necessarily the rest of the gripper jaw cam 134 to remain rotated.

With continuing reference to FIG. 11, the gripper jaw cam 134 includes an upper cam surface 144 that contacts the ends of the first and second gripper jaws 132A, 132B and upon rotation controls the opening and closing of the first and second gripper jaws 132A, 132B in opposition to the first and second gripper jaw springs 136A, 136B. Consequently, when the cam hold-open arm 124 causes the hold-open arm 142 to rotate, it also causes the upper cam surface 144 to rotate and thereby control the opening and closing of the first and second gripper jaws 132A, 132B.

Figure 12:
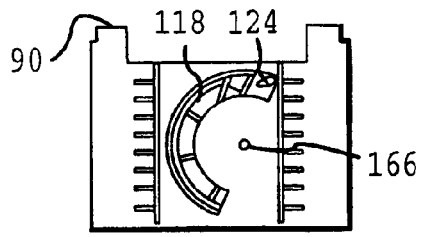
FIG. 12, including sub-drawings 1A-1E, 2A-2E, 3A-3E, and 4A-4E, is a matrix diagram illustrating the relationship of various components in the picker assembly as the gripper crank arm is rotated through its range of motion.
Figure 12:
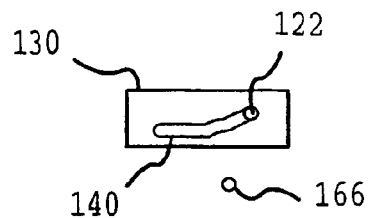
Figure 12:
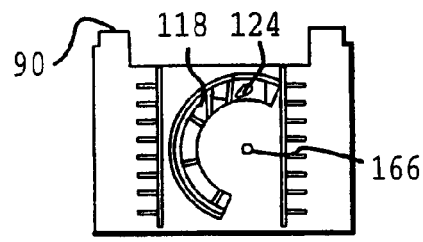
Figure 12:
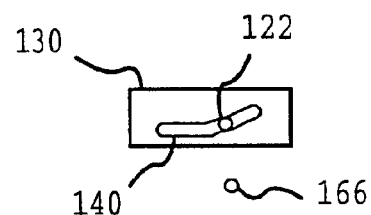
Figure 12:
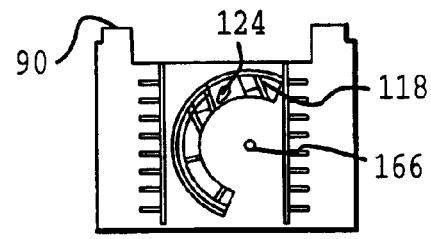
Figure 12:
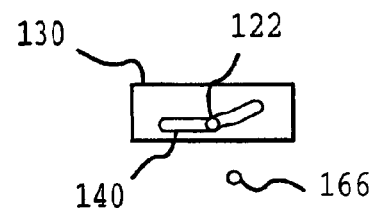
Figure 12:
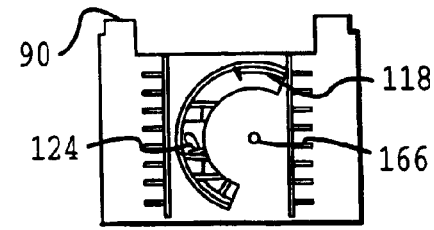
Figure 12:
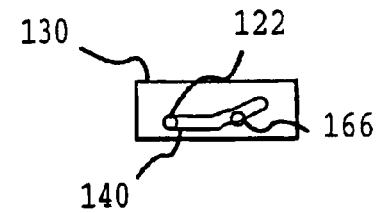
Figure 12:
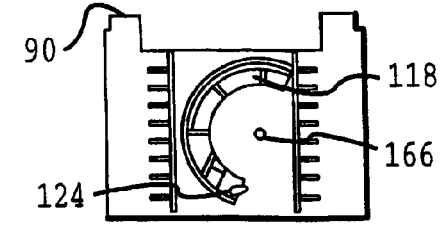
Figure 12:
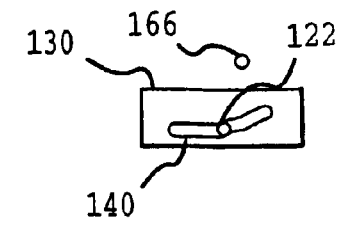
Figure 12:
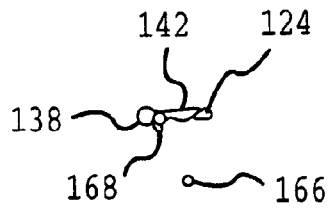
Figure 12:
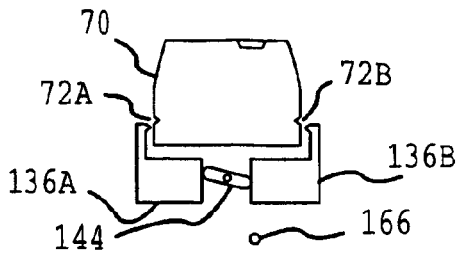
Figure 12:
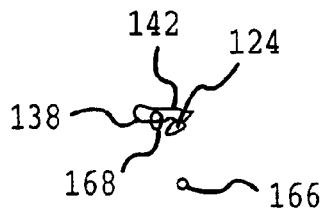
Figure 12:
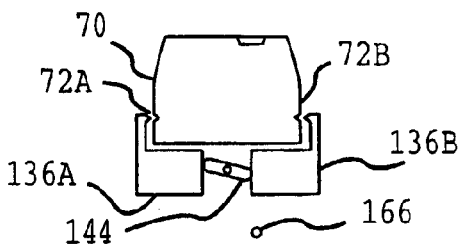
Figure 12:
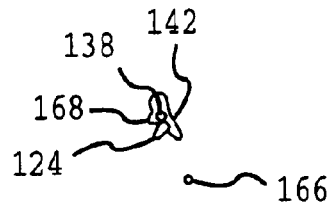
Figure 12:
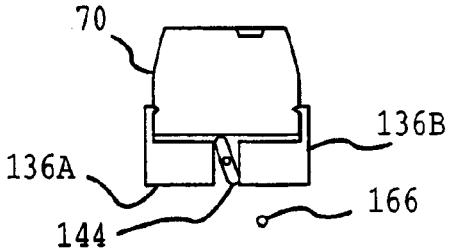
Figure 12:
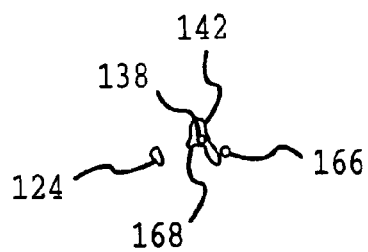
Figure 12:
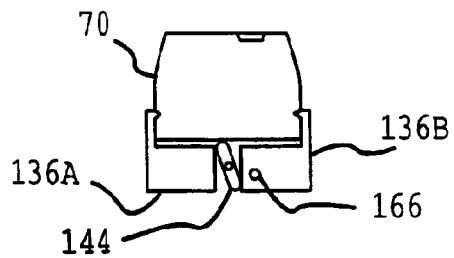
Figure 12:
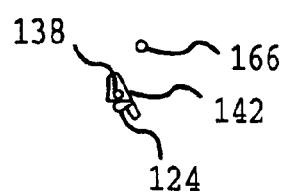
Figure 12:
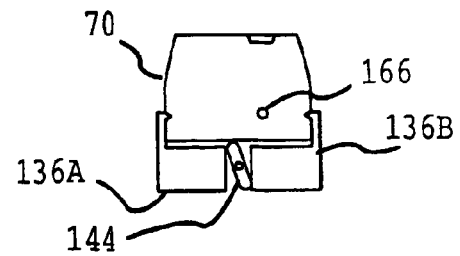

With reference to FIG. 12, the operation of the picker assembly 62 in grasping and extracting/retracting a tape cartridge from either the cartridge holder 56 or the tape drive 58 to a point at which the elevator assembly 61 can move the tape cartridge to another location in the library is described.

Initially, the picker assembly 62 must be positioned in front of a cell in the cartridge holder 56 or the tape drive 58. Such positioning is accomplished with the orientation of elements of the picker assembly 62 illustrated in the sub-drawings 1A-4A of FIG. 12. (A point of reference for all of the sub-drawings in FIG. 12 is an axis of rotation 166 for the gripper crank gear 118). Notably, with this orientation of the picker assembly elements, the picker assembly 62 can be positioned by the elevator assembly 61 in front of any cell in the cartridge holder 56 or in front of the tape drive 58 with the first and second gripper jaws 136A, 136B positioned very close to the gripper notches 72A, 72B of the tape cartridge. As a consequence, the picker assembly 62 avoids the wear and tear that is associated with picker mechanisms where a full extension of the picker mechanism is required after the picker mechanism has been appropriately positioned. To elaborate, when the picker assembly 62 is not grasping a data cartridge (for example, after the insertion of a data cartridge into the holder 56 or the drive 58), the picker assembly 62 and particularly the gripper assembly 108 is capable of being positioned close to the holder 56 or the drive 58 rather than being positioned at the fully retracted position. The fully retracted position is the point at which the elevator assembly 61 can move the picker assembly 62 to desired locations within the library 50 when the gripper assembly 108 is holding a data cartridge. By providing the ability to position the gripper assembly 108 close to the holder 56 or drive 58 when the gripper assembly 108 is not holding a tape cartridge, the wear and tear associated with moving the gripper assembly 108 to retract a data cartridge is avoided, thereby reducing wear and tear on the system. Moreover, the speed of operation is improved.

In sub-drawing 1A, the gripper crank gear 118 has been fully rotated in the clockwise direction. With the gripper crank gear 118 in this position, the pin 122 is positioned at the right end of the crank pin slot 140 (2A); the cam hold-open arm 124 is contacting the hold-open arm 142 (3A); and the upper cam surface 144 is bearing against the ends of the first and second gripper jaws 132A, 132B (in opposition to the first and second gripper jaw springs 136A, 136B) such that the jaws are both laterally spaced and somewhat retracted from the gripper notches 72A, 72B of the cartridge (4A). Again, with this orientation of picker assembly components, the picker assembly 62 can be positioned anywhere within the range of motion defined for the elevator components of the library 50.

In sub-drawing 1B, the gripper crank gear 118 has been rotated in a counter-clockwise direction so as to position the first and second gripper jaws 132A, 132B for gripping the tape cartridge. With the gripper crank gear 118 in this position, the pin 122 has now moved down and left in the crank pin slot 140 such that it is positioned at the end of a straight portion of the slot and at the beginning of an arcuate portion of the slot (2B). Further, the cam hold-open arm 124 is still in contact with the hold-open arm 142 (3B). As a consequence, the upper cam surface 144 is still contacting the ends of the first and second gripper jaws 132A, 132B such that the jaws are laterally spaced from the gripper notches 72A, 72B of the tape cartridge (4B). However, due to the interaction between the pin 122 with the crank pin slot 140, the first and second gripper jaws 132A, 132B are now positioned for grasping the tape cartridge (4B).

In sub-drawing 1C, the gripper crank gear 118 has been further rotated in the counter-clockwise direction so as to cause the first and second gripper jaws 132A, 132B to grasp the tape cartridge. With the gripper crank gear 118 in this position, it should be appreciated that the pin 122 has now moved over the arcuate section of the crank pin slot 140 (2C). The arcuate section of the crank pin slot 140 has a radius measured from the axis 166 that is substantially equal to the radius from the axis 166 to the pin 122. As a consequence, when the pin 122 is moved along this section of the crank pin slot 140, the position of the pusher 130 is substantially unaffected, thereby maintaining the position of the first and second gripper jaws 132A, 132B so that the tape cartridge can be grasped. During the further counter clockwise rotation of the gripper crank gear 118, the cam hold-open arm 124 has begun to disengage from the hold-open arm 142, thereby permitting the hold-open arm 142 to rotate in a clockwise direction (3C). Due to the rotation of the hold-open arm 142, the upper cam surface 144 has also rotated in a clockwise direction, thereby permitting the first and second gripper jaw springs 136A, 136B to pull the first and second gripper jaws 132A, 132B together and thereby grasp the tape cartridge (4C). It should also be appreciated that the cam hold-open arm 124 contacts a safety arm 168 that forces the hold-open arm 142 to rotate if, for some reason, the first and second gripper jaw springs 136A, 136B are unable to force the required rotation of the hold-open arm 142 (3C).

In sub-drawing 1D, the gripper crank gear 118 has been further rotated in the counter- clockwise direction so as to begin to retract the pusher and the tape cartridge back into the picker housing. During the further rotation of the gripper crank gear 118, the pin 122 has moved from the end of the arcuate section of the crank pin slot 140 to the left end of the crank pin slot 140 (2D); the cam hold-open arm has entirely disengaged from the hold-open arm 142 (3D); and the pusher 130 has begun to retract into the picker housing (4D).

In sub-drawing 1E, the gripper crank gear 118 has been further rotated in the counter-clockwise direction so as to fully retract the pusher and the tape cartridge back into the picker housing. During the further rotation of the gripper crank gear 118, the pin 122 has moved from the left end of the crank pin slot 140 back toward the arcuate section of the slot (2E); and the pusher 130 and tape cartridge have been entirely retracted into the picker housing (4E). At this point, the picker assembly 62 can be moved to a new location (a cell of the cartridge holder 56 or the tape drive 58) and the tape cartridge inserted and released by reversing the noted sequence of operations.

It should also be appreciated at this point that, other than the gripper stepper motor 104, no other electro-mechanical device is utilized in the gripping, retracting, inserting and releasing operations.

It should also be appreciated that the circular movement of the gripper crank gear 118 and the interaction of the pin 122 with the pusher 130, which is constrained to move linearly by a rail structure 212 (FIG. 5), the gripper assembly 108 moves in a sinusoidal manner. More specifically, the velocity of the gripper assembly 108 during insertion and retraction is described by a substantially sinusoidal curve, i.e. a plot of the velocity of the gripper assembly during insertion and retraction substantially follows a sinusoidal curve. Moreover, the relationship of the noted elements has been chosen so that when the gripper assembly 108 is near either the holder 56 or drive 58, the velocity of the gripper assembly 108 is at or near a low velocity point on a sinusoidal velocity curve. Relatedly, when the gripper assembly 108 is further from the holder 56 or drive 58, the velocity of the gripper assembly is at a higher velocity point on the sinusoidal velocity curve. Another aspect of this sinusoidal operation is that the force applied by the gripper assembly 108 to a data cartridge is greater near the holder 56 or drive 58 and lower further from the holder 56 or drive 58. This is particularly important when a drive is used that requires a forced insertion/extraction of a data cartridge. In such cases, the operation of the slide pin 120 as a safety is further appreciated.

Figure 13:
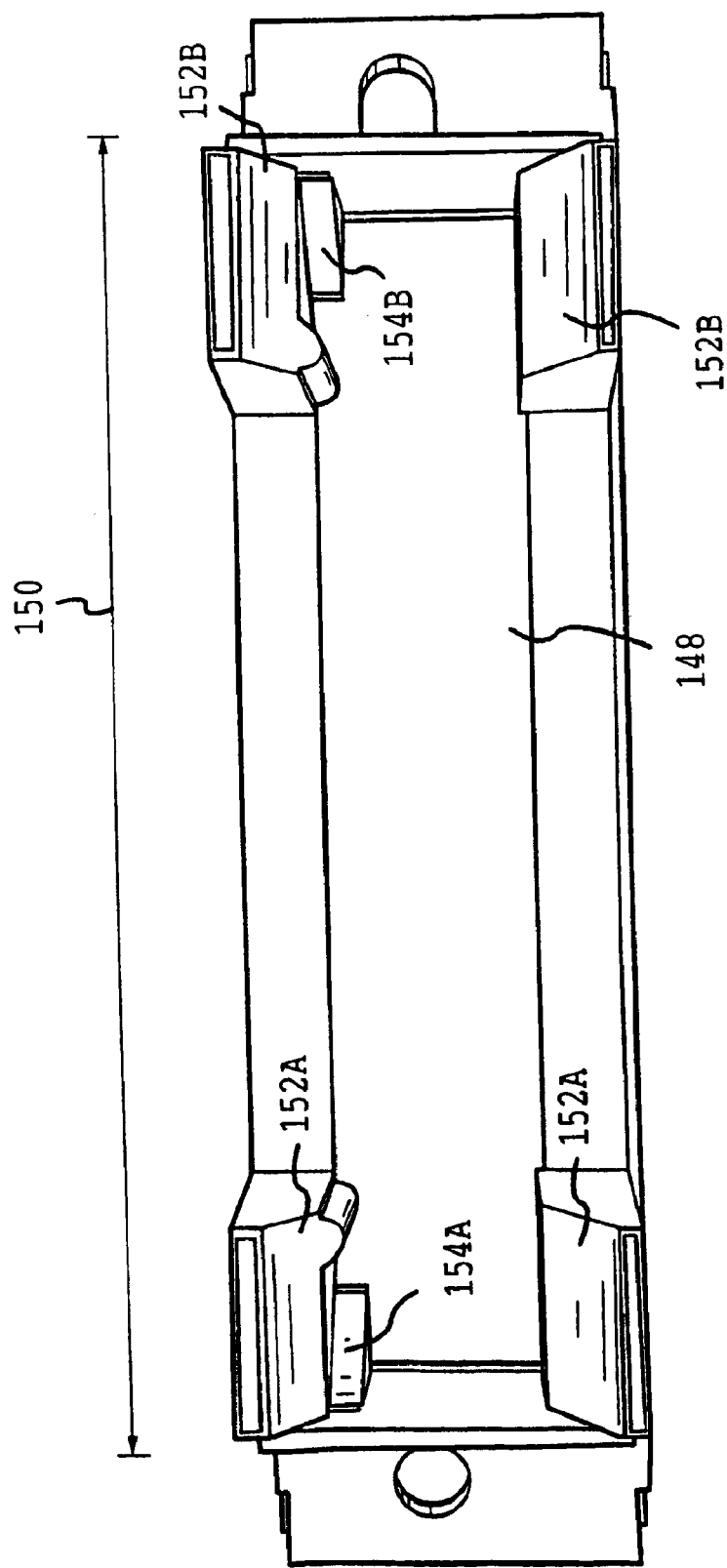
FIG. 13 illustrates the tape drive faceplate extension.

With reference to FIG. 13, the drive faceplate extension 60 is comprised of an opening 148 with a width 150 that is only slightly larger than the width of the Travan tape cartridge illustrated in FIGS. 3A-3C. By keeping the drive faceplate extension 60 narrow, it is possible to maintain the overall width of the library at approximately 8.6", thereby facilitating rack mounting of the library 50 in a greater number of racks. The drive faceplate extension 60 includes first and second pairs of vertical guides 152A, 152B for vertically positioning the Travan tape cartridge 70 for the tape drive 58. First and second step guide ramps 154A, 154B for engaging the first and second vertical steps 78A, 78B of the Travan cartridge 70 and thereby horizontally positioning the cartridge for the tape drive 58. In operation, the first and second pairs of vertical guides 152A, 152B initially engage the cartridge 70 as it is being inserted into the tape drive 58 by the picker assembly 62 and vertically position the cartridge. As the cartridge 70 is inserted further into the tape drive 58 by the picker assembly 62, the first and second step guide ramps 154A, 154B engage the first and second vertical steps 78A, 78B on cartridge 70 and horizontally position the cartridge for the tape drive 58.

Figure 16:
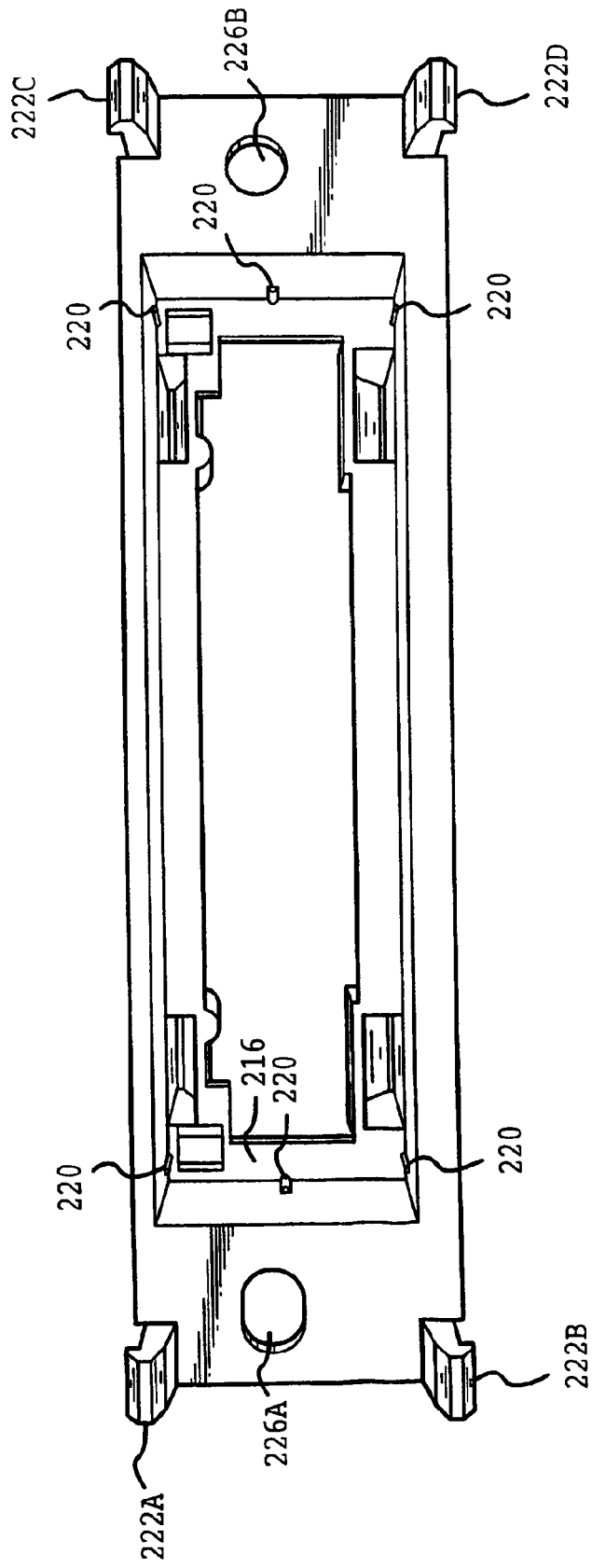
FIGS. 16-18 illustrate the face plate extension.
Figure 17:
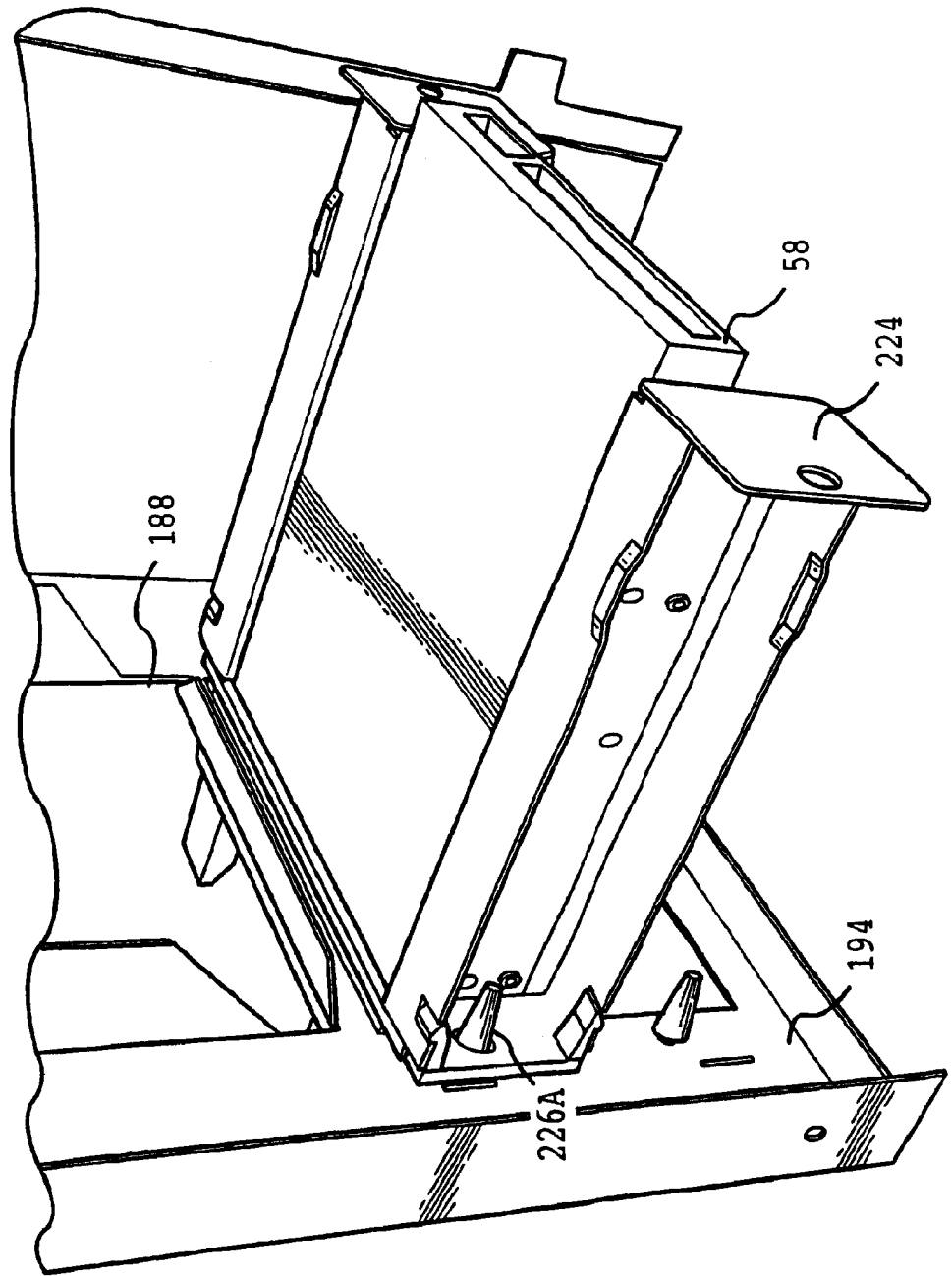
Figure 18:
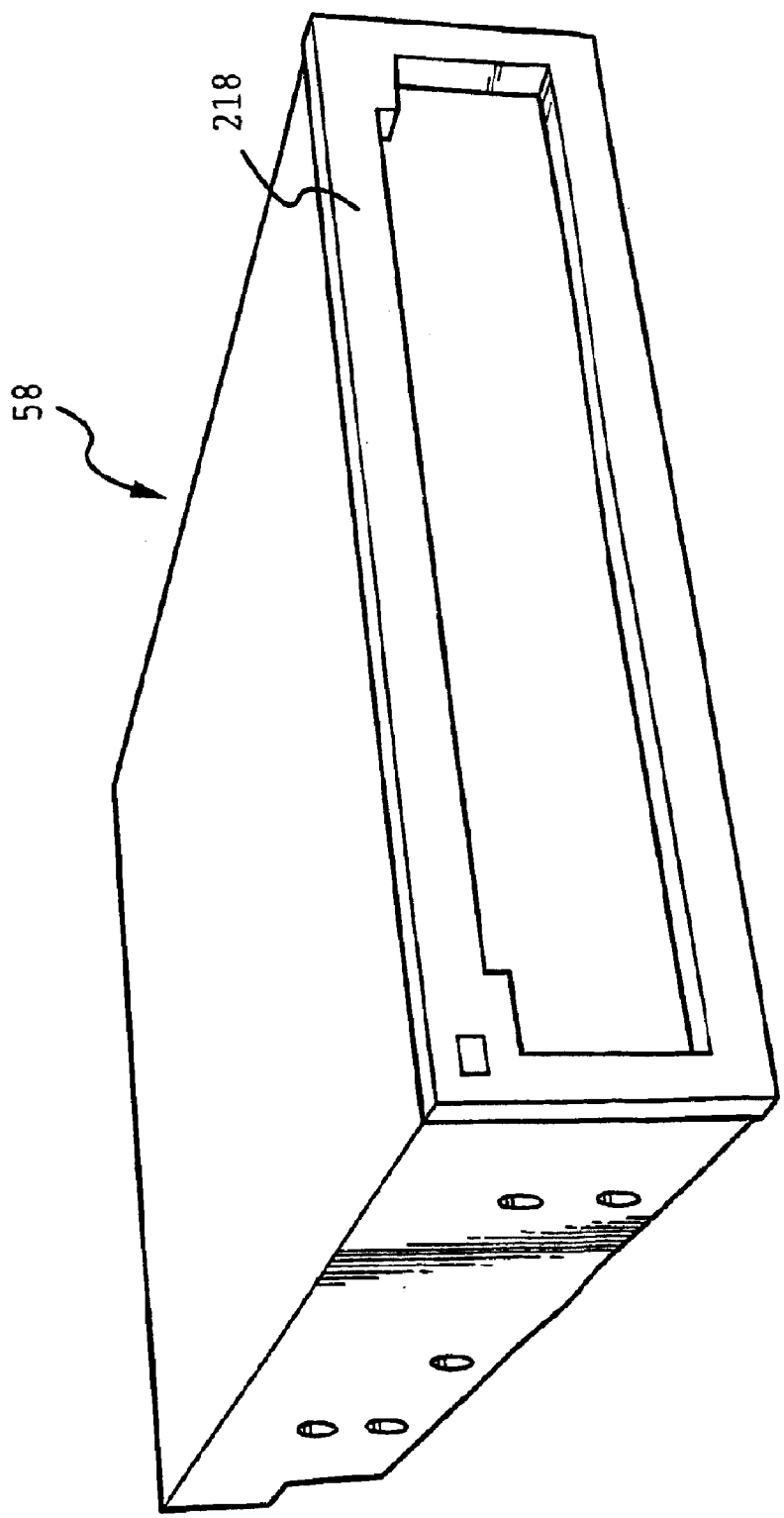
Figure 19:
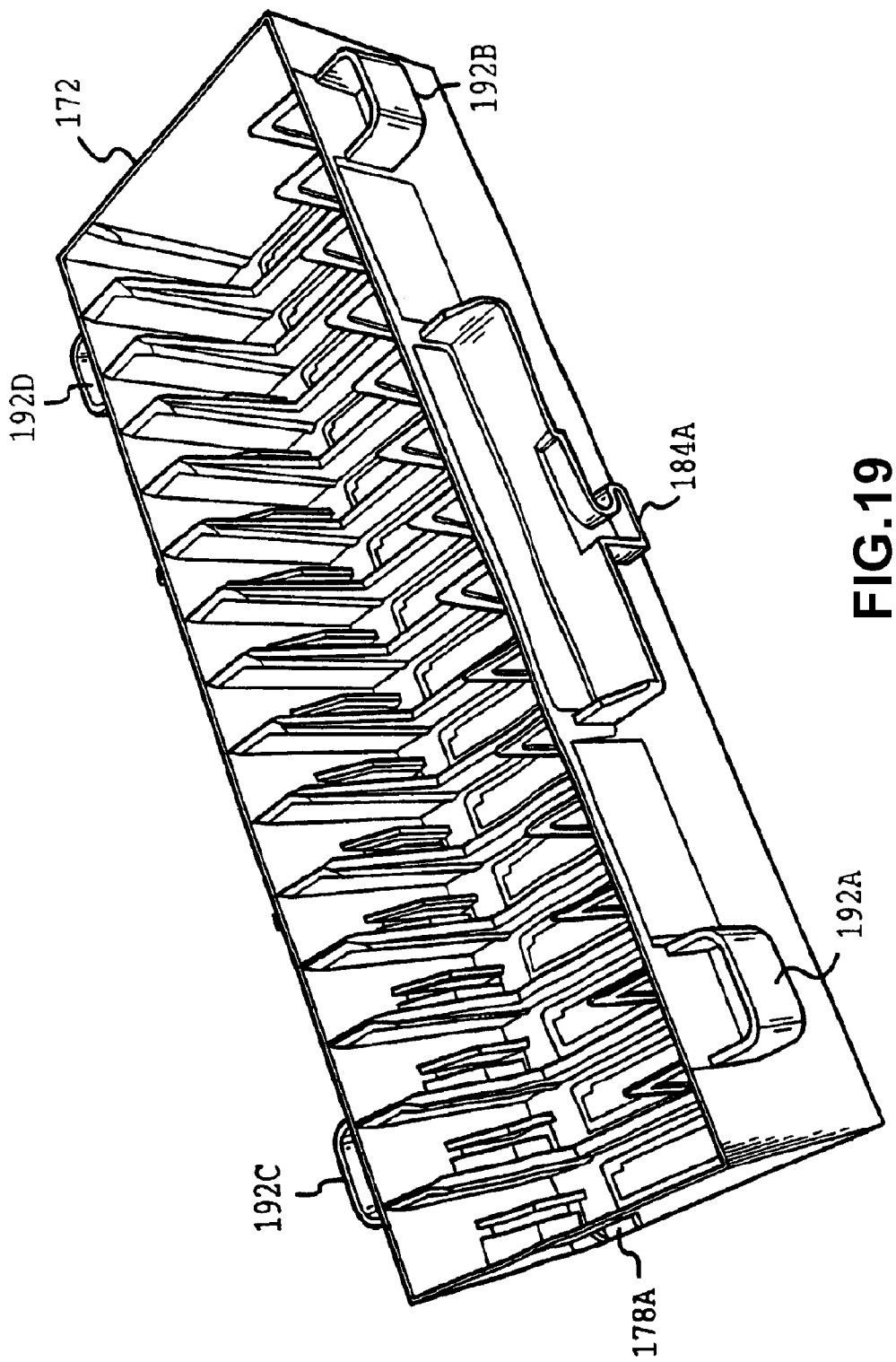
FIGS. 19-23 illustrate the data cartridge holder.
Figure 20:
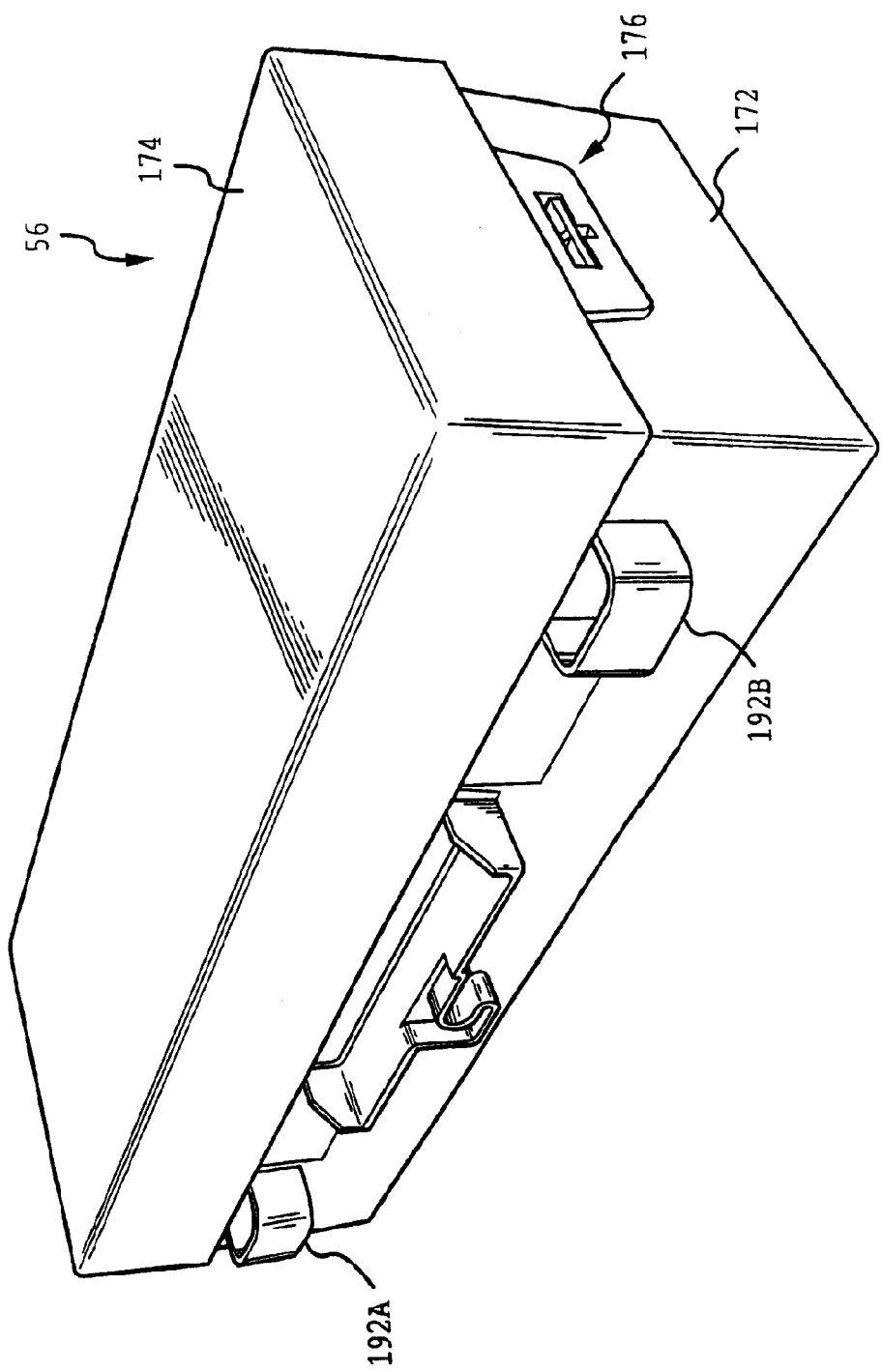

With reference to FIGS. 16-17 and continuing reference to FIG. 13, the face plate extension 60 includes a recess 216 for receiving the face plate 218 of the drive (FIG. 18). Located within the recess 216 are a plurality of crush pins 220 that facilitate a tight fit of the face plate extension 60 over the face plate 218 of the drive 58 and at the same time avoiding the need to manufacture the recess 216 to a high tolerance. The face plate extension 60 also includes clasps 222A-222D that are used to operatively attach the face plate extension 60 to the drive 58. More specifically, the clasps engage notches that are associated with a frame 224 that is, in turn, attached to the drive 58. The face plate extension 60 also includes an orientation device that is used to position the extension 60 as well as the drive 58 within the library while allowing for variations. The orientation device includes a pair of holes 226A, 226B that engage a pair of pins (one of which is illustrated in FIG. 17) associated with the mounting surface 194 within the library. One of the holes is oblong to compensate for manufacturing variations while at the same time cooperating with the other hole, which is round, to fix the position of the drive 58 and extension 60 in two dimensions.

With reference to FIGS. 19-23, the tape cartridge holder 56 is comprised of an open-sided box-like structure 172 that is capable of holding a plurality of tape cartridges and a dust cover 174 for covering the open side of the tape cartridge holder 56 when the holder has, for example, been removed from the cabinet 52. The cartridge holder 56 includes a coupling structure 176 for attaching the dust cover 174 to the open-sided box-like structure. The coupling structure 176 operates to attach the dust cover 174 to the box-like structure both when the holder is not in use and when the holder 56 is in use, i.e. mounted within the cabinet 52. The coupling structure 176 includes a pair of arrow-shaped structures 178A, 178B that are attached to the ends of the box-like structure and a pair of slots 180A, 180B that are associated with the dust cover 174. In operation, the pair of arrow-shaped structures 178A, 178B pass through the pair slots 180A, 180B to attach the dust cover 174 to the box-like structure 172.

Figure 21:
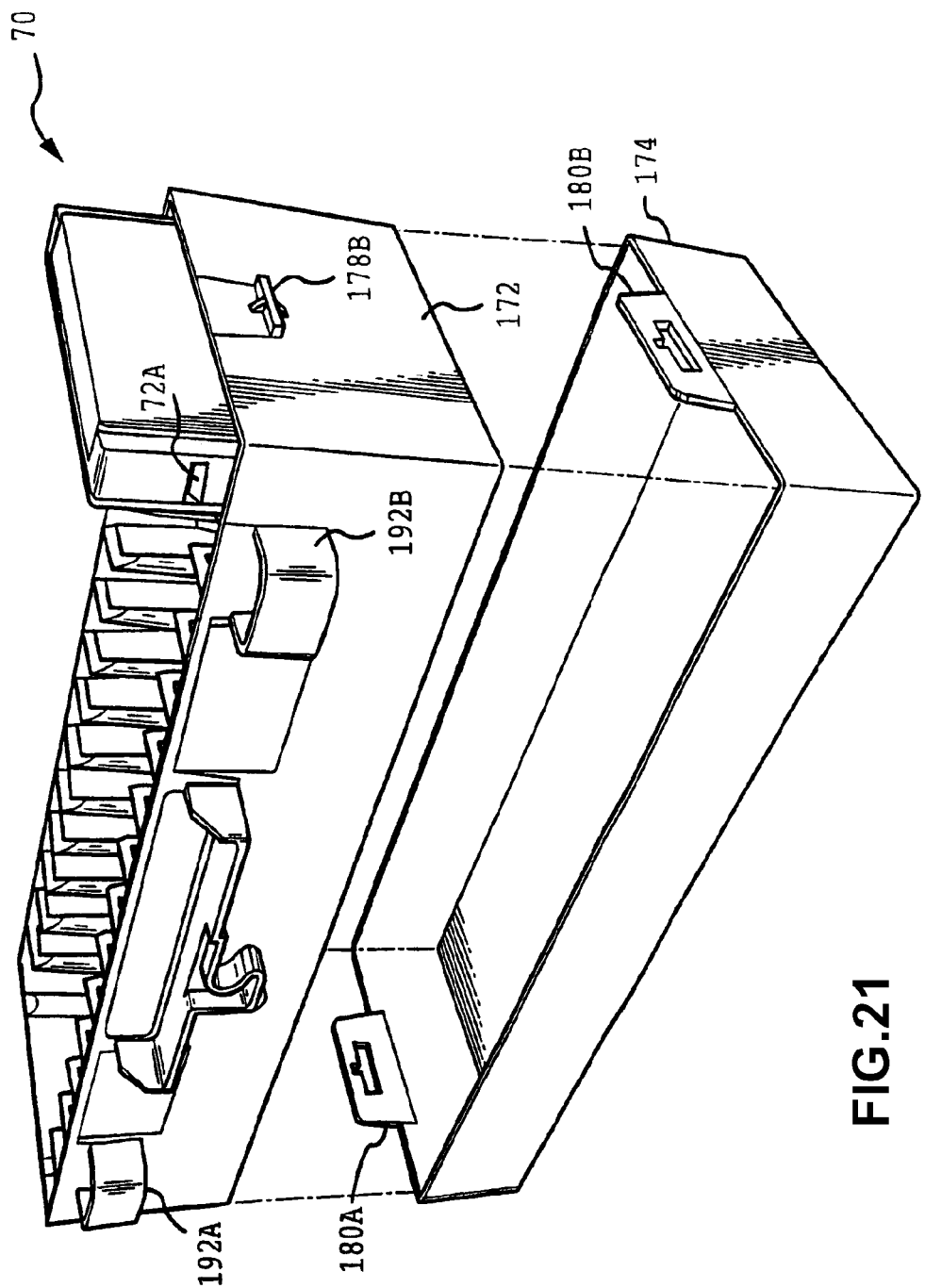

With reference to FIG. 21, the depth of the box-like structure 172 leaves the gripping notches 72A, 72B of the cartridge 70 exposed to facilitate grasping by the picker assembly.

Figure 22:
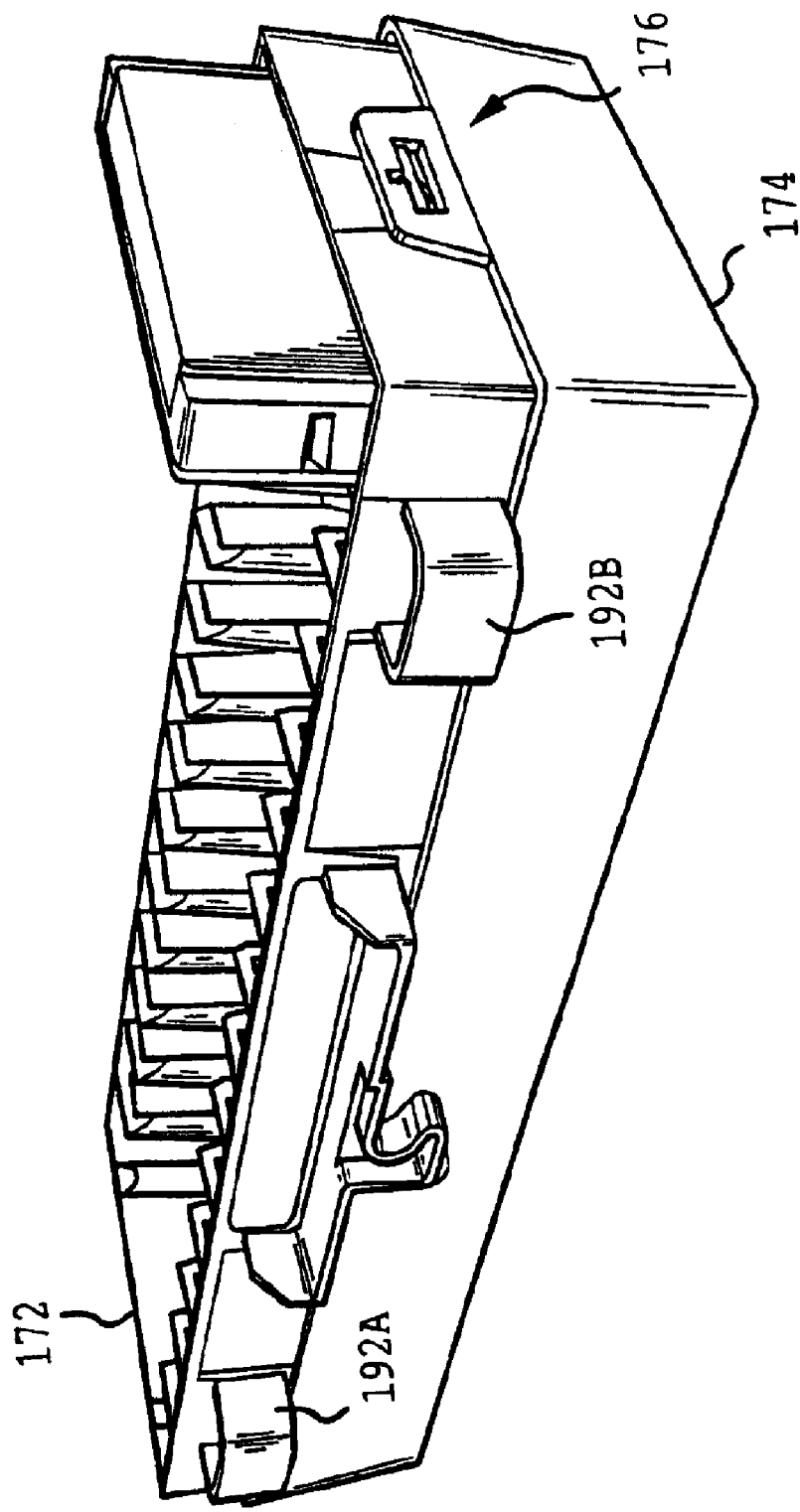
Figure 23:
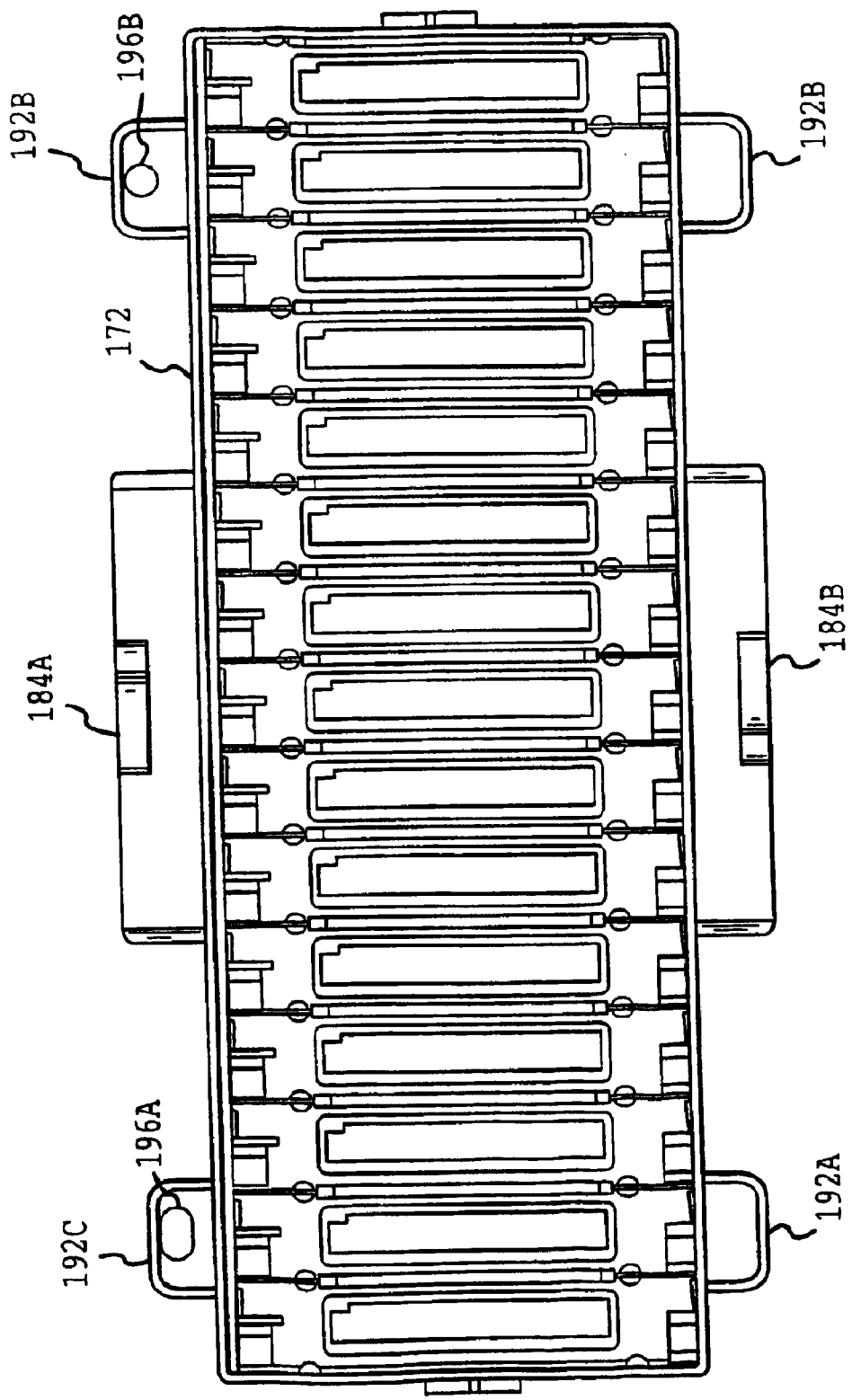

As a consequence, the dust cover 174 has a U-shaped cross-section. Further, the dust cover 174 is of slightly greater length and width than the box-like structure. These greater dimensions permit the dust cover 174 to "nest" the box-like structure 172 when the box-like structure is mounted within the cabinet 52, as shown in FIG. 22. To facilitate this nesting capability the pair of arrow-shaped structures 178A, 178 B are located on the side of the box-like structure at a point that is approximately mid-way between the bottom of the box-like structure 172 and the upper-most surface of a data cartridge that is housed in the holder 56.

With continuing reference to FIGS. 19-23, the removable tape cartridge holder 56 also includes a connector structure for facilitating attachment of the holder 56 within the cabinet 52 of the library 50. The connector structure includes a pair of hooks 184A, 184B that cooperate with a pair of latches 186A, 186B (FIG. 2) located adjacent to a mounting hole 188 (FIG. 2) that receives the box-like structure 172 and any attached dust cover 174. The pair of hooks 184A, 184B are attached to the side of the box-like structure 172 but spaced sufficiently away from the side of box-like structure 172 so as not to interfere with the nesting of the box-like structure 172 within the dust cover 174.

The connector structure also provides a reference structure that facilitates proper orientation of the holder when mounted in the cabinet 54. With continuing reference to FIGS. 19-23, the flat undersides of mounting bosses 192A-192D define a reference plane that contacts the flat mounting surface 194 (FIG. 2) adjacent to the hole 188 that receives the holder 56 within the cabinet 52 when the holder 56 is properly oriented in one dimension. Further, bosses 192C, 192D respectively include holes 196A, 196B that receive mounting pins 198A, 198B (FIG. 2) that are associated with the mounting surface 194 to properly orient the holder in the other two dimensions. Because the holder is symmetrical about its longitudinal axis, the mounting pins 198A, 198B and the holes 196A, 196B also insure that the holder 56 is oriented so that cartridges are stored in the holder 56 with an orientation that facilitates the transfer of cartridges between the holder 56 and the drive 58.

Figure 14:
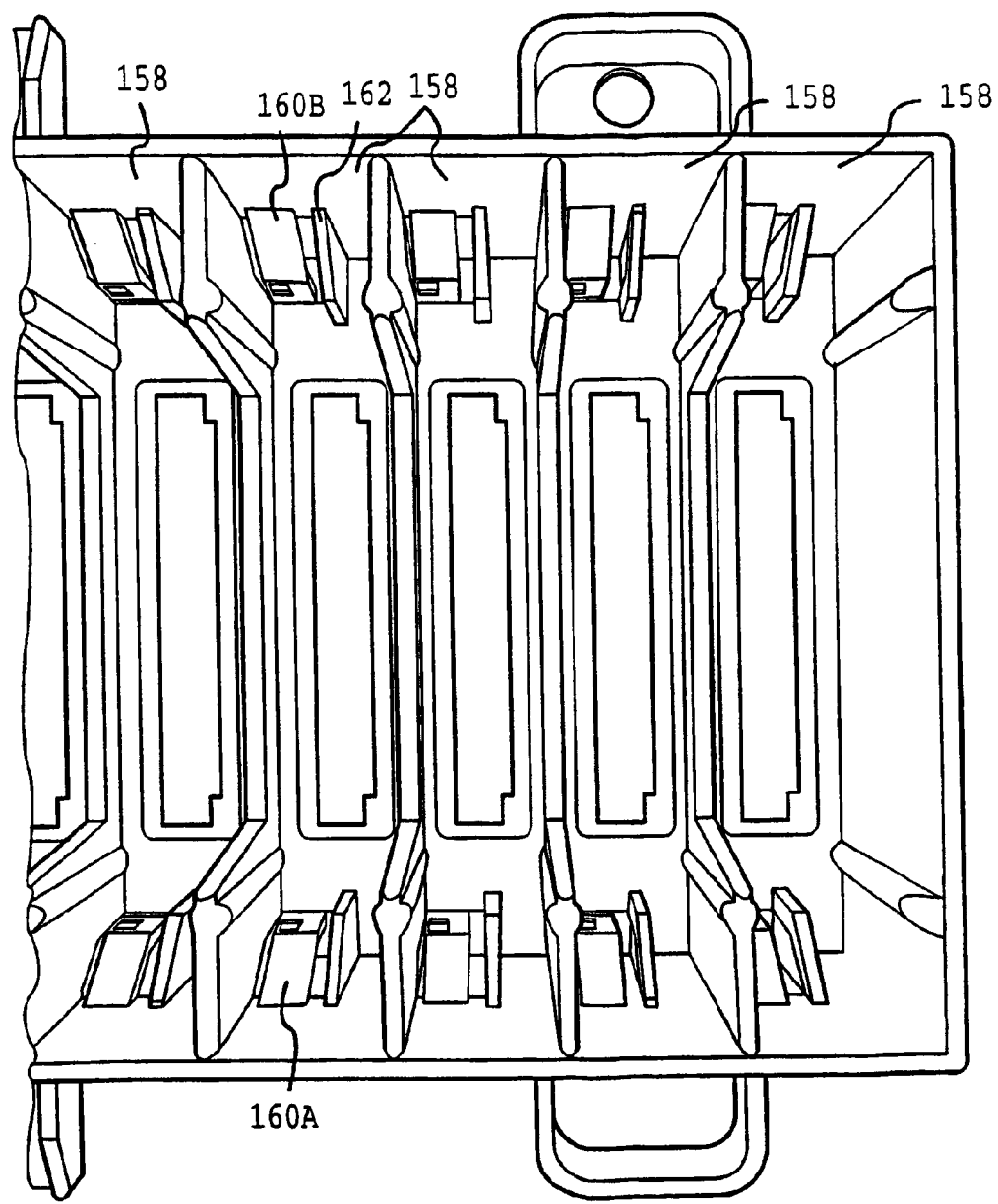
FIG. 14 illustrates a number of the retaining cells in the tape cartridge holder.
Figure 15:
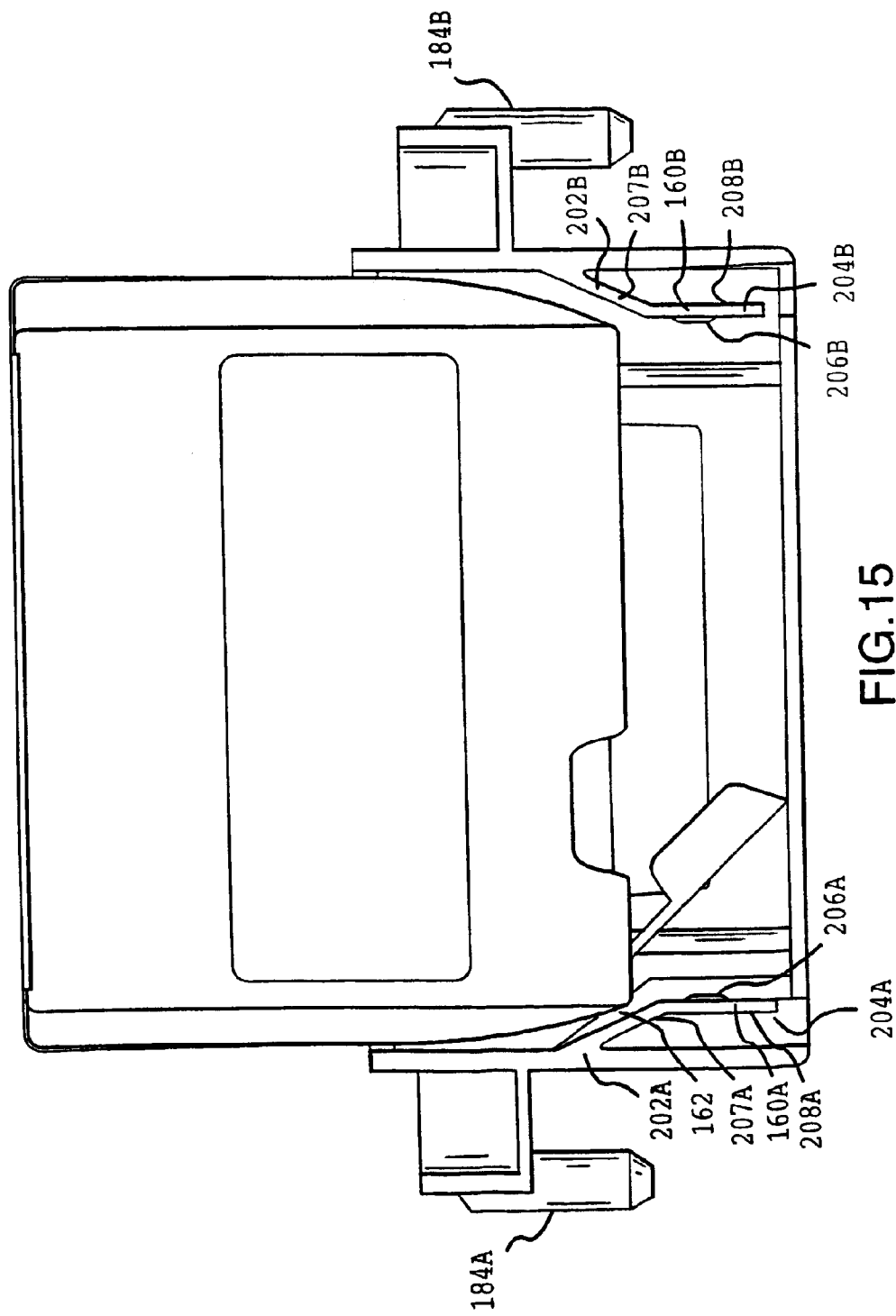
FIG. 15 illustrates how the cartridge orientation control rib in one of the retaining cells of the tape cartridge holder prevents a tape cartridge from being inserted into the holder with the incorrect orientation.

With reference to FIGS. 14 and 15, the tape cartridge holder 56 is comprised of a number of cells 158. Associated with each cell of the tape cartridge holder 56 are structures for retaining the Travan cartridge 70 and for preventing the Travan cartridge 70 from being inserted with the incorrect orientation for the picker assembly 62 and the tape drive 58. If the cartridge holder 56 permitted a tape cartridge to be inserted with the incorrect orientation, operation of the picker assembly 62 and tape drive 58 could be adversely affected.

For retaining a tape cartridge, each cell has a first and second flexible cartridge retention clips 160A, 160B that respectively engage the retaining notches 74A, 74B of the Travan cartridge 70. The picker assembly 62 is capable of applying enough force to overcome the bias of the first and second flexible cartridge retention clips 160A, 160B for purposes of inserting a cartridge into and removing a cartridge from the cartridge holder 56. The retaining clips 160A, 160B respectively have fixed ends 202A, 202B that are attached to the interior side of the box-like structure 172 and free ends 204A, 204B that are located closer to the bottom of the box-like structure 172 than the fixed ends and are free to flex in response to the insertion/retraction of a data cartridge. The free ends 204A, 204B respectively include detents 206A, 206B that engage the retaining notches 74A, 74B of the data cartridge. The detents 206A, 206B are sloped to facilitate the engagement of the detents 206A, 206B to the notches 74A, 74B and the subsequent disengagement therefrom. The retaining clips 160A, 160B are dog-leg shaped with upper portions 207A, 207B and lower portions 208A, 208B. The upper portions 207A, 207B are disposed at an acute angle to the side of the holder 56 to facilitate insertion of a tape cartridge into the holder. In addition, the upper portions 207A, 207B provide contact surfaces during the insertion of a data cartridge that facilitate the displacement of the lower portions 208A, 208B and thereby facilitate the insertion of the data cartridge.

For preventing a tape cartridge from being inserted with the incorrect orientation, each cell includes a cartridge orientation control rib 162. With reference to FIG. 15, if a tape cartridge is inserted with one type of incorrect orientation, the control rib 162 operates to open the access door 80 of the tape cartridge 70 and prevent insertion of the cartridge into the cell. To elaborate, when the access door 80 is opened, a portion of the door engages the box-like structure 172 to inhibit further insertion of the cartridge into the cell. Generally, this improper insertion of a tape cartridge 70 into the cartridge holder 56 occurs when a person rather than the picker is loading tape cartridges into the holder prior to placing the holder in the cabinet 52. While the rib 162 is illustrated in FIG. 15 as preventing insertion when the cartridge is inserted front side 228E first (which is correct) but backwards, the rib 162 also prevents insertion when the back side 228F is inserted first. In this case, the rib 162 contacts the cartridge housing in a manner that interferes with the insertion.

The foregoing description of the invention has been presented for the purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extend permitted by the prior art.

What is claimed is:

1. A data cartridge holder comprising: a box-like structure that has an interior space adapted to accommodate a plurality of data cartridges, comprising: a bottom wall with an interior bottom surface and exterior bottom surface; and a side wall that is operatively attached to said bottom wall, extends from said bottom wall to a side wall terminal edge, and has an interior side surface and an exterior side surface; wherein said interior bottom surface and said interior side surface define said interior space; wherein said side wall terminal edge defines an opening for the insertion/extraction of data cartridges into/from said interior space; and a mounting interface adapted to engage a mounting structure of a data cartridge library system, comprising: a first hook-like structure fixedly attached in a substantially immobile relationship, wherein said hook-like structure does not pivot about a secondary member, and said a first hook-like structure having a first orientation; and a second hook-like structure operatively attached to said exterior side surface, located on an opposite side of said box-like structure relative to said first hook-like structure, and having a second orientation that is substantially opposite to said first orientation.

2. The data cartridge holder, as claimed in claim 1, wherein said first hook-like structure is operatively attached to a first flange that is operatively attached to said exterior side surface such that said first hook-like structure is spaced from said exterior side surface; and said second hook-like structure is operatively attached to a second flange that is operatively attached to said exterior side surface such that said second hook-like structure is spaced from said exterior side surface.

3. The data cartridge holder, as claimed in claim 1, further comprising: a reference structure for facilitating orientation of the holder relative to the mounting structure of a data cartridge library.

4. The data cartridge holder, as claimed in claim 3, wherein: said reference structure comprises a first boss that is operatively attached to said exterior side surface and a second boss that is operatively attached to said exterior side surface.

5. The data cartridge holder, as claimed in claim 4, wherein: said first boss has a first hole that is circular; and said second boss has a second hole that is oblong.

6. The data cartridge holder, as claimed in claim 1, further comprising: a dust cover adapted to be placed over said interior space when the data cartridge holder is not in a state in which one of said plurality of data cartridges may be inserted/extracted into/from said box-like structure.

7. The data cartridge holder, as claimed in claim 6, wherein: said dust cover is adapted so that said box-like structure can be nested within said dust cover when said box-like structure is in a state in which one of said plurality of data cartridges may be inserted/extracted into/from said box-like structure.

8. The data cartridge holder, as claimed in claim 7, wherein: said first and second hook-like structures each extend laterally outward from said exterior side wall so that at least a portion of each of said first and second hook-like structures extend laterally beyond an exterior surface of said dust cover when said box-like structure is nested within said dust cover.

9. The data cartridge holder, as claimed in claim 1, further comprising: one or more of said plurality of data cartridges located within said box-like structure.

10. A data cartridge holder comprising: a box-like structure with an interior space adapted to accommodate a plurality of data cartridges, comprising: a bottom wall with an interior bottom surface and exterior bottom surface; and a side wall operatively attached to said bottom wall, extending from said bottom wall to a side wall terminal edge, and having an interior side surface, and an exterior side surface; wherein said interior bottom surface and said interior side surface define said interior space; wherein said side wall terminal edge defines an opening for the insertion/extraction of said data cartridges into/from said interior space; a mounting interface adapted to engage a mounting structure of a data cartridge library system, wherein said mounting interface comprises: a first hook-like structure operatively attached to said exterior side surface; and a second hook-like structure operatively attached to said exterior side surface and located on an opposite said of said box-like structure relative to said first hook-like structure; and a dust cover adapted to be engaged with said box-like structure in a first position and a second position; wherein when engaged with said box-like structure in said first position, said dust cover encloses said interior space; and wherein when engaged with said box-like structure in said second position, said dust cover does not impede insertion/extraction of said data cartridges into/from said interior space and said dust cover does not impede the engagement of said mounting interface with said mounting structure of said data cartridge library system.

11. The data cartridge holder, as claimed in claim 10, wherein:
said first book-like structure has a first orientation and said second hook-like structure has a second orientation that is substantially opposite to said first orientation.

12. The data cartridge holder, as claimed in claim 10, wherein said first hook-like structure is operatively attached to a first hook-like structure that is operatively attached to said exterior side surface such that said first hook-like structure is spaced from said exterior side surface; and said second hook-like structure is operatively attached to a second hook-like structure that is operatively attached to said exterior side surface such that said second hook-like structure is spaced from said exterior side surface.

13. The data cartridge holder, as claimed in claim 12, wherein:
said first and second hook-like structures extend laterally outward from said exterior side wall so that at least a portion of said first and second hook-like structures extend laterally beyond an exterior surface of said dust cover when said box-like structure is nested within said dust cover.

14. The data cartridge holder, as claimed in claim 10, further comprising: a reference structure for facilitating orientation of the holder relative to the mounting structure of said data cartridge library.

15. The data cartridge holder, as claimed in claim 14, wherein: said reference structure comprises a first boss that is operatively attached to said exterior side surface and a second boss that is operatively attached to said exterior side surface.

16. The data cartridge holder, as claimed in claim 15, wherein: said first boss has a first hole that is circular; and said second boss has a second hole that is oblong.

17. The data cartridge holder, as claimed in claim 10, further comprising: one or more data cartridges located within said box-like structure.

* * * * *